US012735588B2

(12) United States Patent
Hook et al.

(10) Patent No.: US 12,735,588 B2
(45) Date of Patent: Sep. 15, 2026

(54) PRINTING COMPOSITIONS AND METHODS THEREFOR

(71) Applicant: Cryovac, LLC, Charlotte, NC (US)

(72) Inventors: Kevin J. Hook, Grand Island, NY (US); Stanley Litman, Amherst, NY (US); Lawrence A. Pilon, Hamburg, NY (US); Morgan Ashley Edwards, Sanborn, NY (US)

(73) Assignee: Cryovac, LLC, Charlotte, NC (US)

( * ) Notice: Subject to any disclaimer, the term of this patent is extended or adjusted under 35 U.S.C. 154(b) by 149 days.

(21) Appl. No.: 18/290,038

(22) PCT Filed: May 13, 2022

(86) PCT No.: PCT/US2022/029128
§ 371 (c)(1),
(2) Date: Nov. 9, 2023

(87) PCT Pub. No.: WO2022/241181
PCT Pub. Date: Nov. 17, 2022

(65) Prior Publication Data

US 2024/0327662 A1 Oct. 3, 2024

Related U.S. Application Data

(60) Provisional application No. 63/247,935, filed on Sep. 24, 2021, provisional application No. 63/187,975, filed on May 13, 2021.

(51) Int. Cl.
*C09D 11/322* (2014.01)
*B41J 2/01* (2006.01)
(Continued)

(52) U.S. Cl.
CPC .............. *C09D 11/322* (2013.01); *B41J 2/01* (2013.01); *B41J 2/2107* (2013.01); *C09D 11/10* (2013.01); *C09D 11/102* (2013.01); *C09D 11/38* (2013.01)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 8,114,485 B1 * 2/2012 Schwendimann ..... B41M 5/502 428/688
11,518,898 B2 12/2022 Iioka et al.
(Continued)

FOREIGN PATENT DOCUMENTS

EP 3543298 9/2019
WO 2012170036 12/2012
(Continued)

*Primary Examiner* — Manish S Shah
(74) *Attorney, Agent, or Firm* — Jason R. Womer

(57) ABSTRACT

An ink jet printing composition comprises from 1.00% to 6.00% by weight of at least one pigment, from 5.00% to 11.00% by weight of at least one polymer, from 14.50% to 17.50% by weight of at least one co-solvent, from 4.50% to 5.50% by weight of at least one humectant, from 1.00% to 2.75% by weight of at least one surfactant, and water. Other ink jet printing compositions and a method of printing are also disclosed.

20 Claims, 1 Drawing Sheet

(51) Int. Cl.

| | |
|---|---|
| ***B41J 2/21*** | (2006.01) |
| ***C09D 11/10*** | (2014.01) |
| ***C09D 11/102*** | (2014.01) |
| ***C09D 11/38*** | (2014.01) |

(58) Field of Classification Search

CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227

See application file for complete search history.

(56) References Cited

U.S. PATENT DOCUMENTS

| | | | | |
|---|---|---|---|---|
| 2003/0184629 | A1* | 10/2003 | Valentini | C09D 11/324 347/100 |
| 2004/0189762 | A1* | 9/2004 | Chen | B41M 5/0023 347/100 |
| 2010/0189842 | A1* | 7/2010 | Toren | A23G 3/343 426/631 |
| 2011/0048278 | A1* | 3/2011 | Kiyomoto | C09D 11/38 106/31.89 |
| 2013/0237661 | A1 | 9/2013 | Brust et al. | |
| 2016/0046816 | A1 | 2/2016 | Takahashi et al. | |
| 2017/0009092 | A1* | 1/2017 | Gotou | C09D 11/322 |
| 2017/0022382 | A1 | 1/2017 | Punet et al. | |
| 2018/0001669 | A1* | 1/2018 | Furukawa | C09D 11/322 |
| 2018/0105710 | A1 | 4/2018 | Hong et al. | |
| 2019/0077981 | A1* | 3/2019 | Uotome | B41J 2/01 |
| 2019/0284420 | A1* | 9/2019 | Sugiyama | B41J 2/2114 |
| 2020/0047532 | A1 | 2/2020 | Deighton et al. | |
| 2020/0253247 | A1* | 8/2020 | Yokota | C09B 67/0083 |
| 2021/0062022 | A1 | 3/2021 | Sowinski et al. | |
| 2022/0324245 | A1* | 10/2022 | Van Gaens | B41J 2/21 |

FOREIGN PATENT DOCUMENTS

| | | |
|---|---|---|
| WO | 2018156195 | 8/2018 |
| WO | 2020031745 | 2/2020 |
| WO | 2021183710 | 9/2021 |
| WO | 2021183742 | 9/2021 |

* cited by examiner

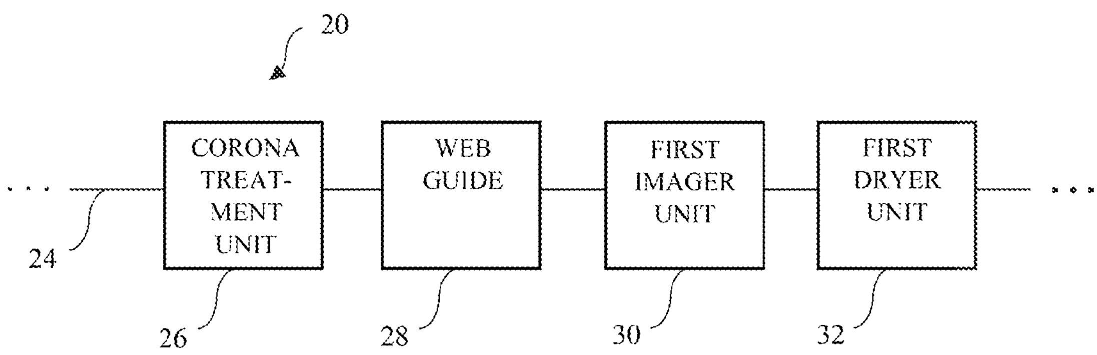
20
CORONA TREAT-MENT UNIT
WEB GUIDE
FIRST IMAGER UNIT
FIRST DRYER UNIT
24
26
28
30
32

PRINTING COMPOSITIONS AND METHODS THEREFOR

CROSS-REFERENCE TO RELATED APPLICATIONS

This application claims priority to U.S. Patent Application Ser. No. 63/187,975, filed May 13, 2021, entitled "Printing Compositions and Methods Therefor," and U.S. Patent Application Ser. No. 63/247,935, filed Sep. 24, 2021, entitled "Printing Compositions and Methods Therefor," the entirety of each which is incorporated herein by reference.

BACKGROUND

The present subject matter relates to printing compositions and methods, and more particularly, printing compositions and methods for use on a polymeric flexible and/or shrinkable substrate.

Ink jet printing is a well-known technique wherein a digital image is recreated upon a substrate by depositing droplets of ink onto the substrate.

Additionally, high speed printing systems have been developed for printing on a substrate, such as a web of shrinkable polymeric film. Such a material typically exhibits both elasticity and plasticity characteristics that depend upon one or more applied influences, such as force, heat, chemicals, electromagnetic radiation, etc. These characteristics must be carefully taken into account during the system design process because it may be necessary; 1.) to control material shrinkage during imaging so that the resulting imaged film may be subsequently used in a shrink-wrap process, and 2.) to avoid system control problems by minimizing dynamic interactions between system components due to the elastic deformability of the substrate. Such considerations also impact the process of registering printed content so that the content is accurately reproduced.

Specifically, a flexible web may be printed simplex (i.e., on one side) or duplex (that is, two sided). In either event, separately printed images, even if printed by a single printing unit (e.g., a multi-color imager unit), must be accurately registered with one another to minimize misregistration errors, such as color shifts, moiré, undesired dot gain effects, or the like.

Furthermore, the use of water-based inks for commercial print applications, including but not limited to ink jet printing, has been on the increase due in part to environmental and health concerns about volatile organic compounds ("VOC's") in solvent-based compositions that are emitted during the drying process.

Health concerns are highlighted when printing for the food industry. For instance, Switzerland has legislation in place regulating food-packaging printing inks. A list of components that may be used in printing inks have been compiled in an effort to remove some substances deemed carcinogenic, mutagenic, or toxic to reproduction. While only required in Switzerland, the Swiss Ordinance on Materials and Articles in Contact with Food (SR 817.023.21) with respect to printing inks and coatings alike is generally accepted worldwide as a useful guide when creating ink(s) and/or ink receptive compound(s) for indirect food contact purposes, such as for food packaging. The current version of the Swiss Ordinance on Materials and Articles in Contact with Food (SR 817.023.21), as of the filing date of this application is hereby incorporated in its entirety by reference herein. To the extent not included in the current version of the Swiss Ordinance on Materials and Articles in Contact with Food (SR 817.023.21) as of the filing date of this application, Annex 10 Edition 2.1 of the Swiss Ordinance on Materials and Articles in Contact with Food (SR 817.023.21) dated Dec. 1, 2020, is also hereby incorporated in its entirety by reference herein concerning materials and articles intended to come into contact with foodstuffs.

As for general printing on a substrate or web that is porous or permeable, water within the ink is partially absorbed by the surface of the web during a drying process. However, there exists a problem when water-based inks are deposited on a web that is impermeable, such as a plastic web. Since inks dry primarily via evaporation during a drying and/or curing period, the lack of ability of the water-based ink to penetrate or absorb into the web itself leads to individual ink droplets spreading across the surface of the web. If a compilation of individual ink droplets spread and touch one another, the desired image quality may be adversely affected due to coalescing of the adjacent ink droplets. This is a problem that typically occurs with high-speed printing.

Furthermore, to achieve the desired properties such as proper adhesion and rub resistance in current systems, multiple layers of inks and coatings may be necessary. For instance, a primer layer may be placed upon a web prior to an ink layer being deposited in the same location as the primer layer. Furthermore, an overprint varnish or coating may be placed upon the ink layer to achieve the proper rub resistance.

Additionally, another problem that may arise during high-speed printing comprises "ink retransfer" or "pickoff", where the ink for the printed image has not sufficiently dried before contacting another part of the web system, such as an idler roller, and the ink is transferred unintentionally from the printed area to the roller.

Furthermore, if during the printing process the temperature of the substrate exceeds the substrate's threshold for dimensional integrity, the substrate may shrink and/or deform leading to unusable product.

The discussion above is merely provided for general background information and is not intended to be used as an aid in determining the scope of the claimed subject matter.

BRIEF DESCRIPTION

An ink jet printing composition comprises from 1.00% to 6.00% by weight of at least one pigment, from 5.00% to 11.00% by weight of at least one polymer, from 14.50% to 17.50% by weight of at least one co-solvent, from 4.50% to 5.50% by weight of at least one humectant, from 1.00% to 2.75% by weight of at least one surfactant, and water. Other ink jet printing compositions and a method of printing are also disclosed.

According to one aspect, an ink jet printing composition comprises from 1.00% to 6.00% by weight of at least one pigment, from 5.00% to 11.00% by weight of at least one polymer, from 14.50% to 17.50% by weight of at least one co-solvent, from 4.50% to 5.50% by weight of at least one humectant, from 1.00% to 2.75% by weight of at least one surfactant, and water.

According to another aspect, an ink jet printing composition comprises from 1.00% to 6.00% by weight of at least one pigment, from 4.50% to 8.50% by weight of at least one polymer, from 14.50% to 17.50% by weight of at least one co-solvent, from 4.50% to 5.50% by weight of at least one humectant, from 0.75% to 1.25% by weight of at least one surfactant, and water.

According to yet another aspect, an ink jet printing composition comprises from 6.50% to 9.50% by weight of at least one pigment, from 4.50% to 7.50% by weight of at least one polymer, from 13.50% to 16.50% by weight of at least one co-solvent, from 0.15% to 0.45% by weight of at least one surfactant, and water.

According to yet another aspect, an ink jet printing composition comprises from 6.50% to 9.50% by weight of at least one pigment, from 2.25% to 3.75% by weight of at least one polymer, from 2.25% to 3.75% by weight of at least one opacifier, from 13.50% to 16.50% by weight of at least one co-solvent, from 0.15% to 0.45% by weight of at least one surfactant, and water.

According to yet another aspect, an ink jet printing composition comprises from 11.00% to 12.00% by weight of at least one polymer, from 15.50% to 18.50% by weight of at least one co-solvent, from 4.50% to 5.50% by weight of at least one humectant, from 0.35% to 0.65% by weight of at least one surfactant, and water.

According to yet another aspect, an ink jet printing composition comprises from 0.40% to 0.60% by weight of at least one optical brightener, from 8.00% to 10.00% by weight of at least one polymer, from 13.50% to 16.50% by weight of at least one co-solvent, from 0.15% to 0.35% by weight of at least one surfactant, from 0.50% to 2.00% by weight of at least one polymer modifier, and water.

According to yet another aspect, an ink jet printing composition comprises from 1.00% to 6.00% by weight of at least one pigment, from 4.50% to 8.50% by weight of at least one polymer, from 13.50% to 16.50% by weight of at least one co-solvent, from 0.05% to 0.40% by weight of at least one surfactant, and water.

According to yet another aspect, a method of printing comprises providing a substrate, applying an ink jet printing composition to a surface of the substrate, the ink jet printing composition comprising from 1.00% to 6.00% by weight of at least one pigment, from 5.00% to 11.00% by weight of at least one polymer, from 14.50% to 17.50% by weight of at least one co-solvent, from 4.50% to 5.50% by weight of at least one humectant, from 1.00% to 2.75% by weight of at least one surfactant, and water, and drying the substrate.

According to yet another aspect, a method of printing comprises providing a substrate, applying an ink jet printing composition to a surface of the substrate, the ink jet printing composition comprising from 1.00% to 6.00% by weight of at least one pigment, from 4.50% to 8.50% by weight of at least one polymer, from 14.50% to 17.50% by weight of at least one co-solvent, from 4.50% to 5.50% by weight of at least one humectant, from 0.75% to 1.25% by weight of at least one surfactant, and water, and drying the substrate.

According to yet another aspect, a method of printing comprises providing a substrate, applying an ink jet printing composition to a surface of the substrate, the ink jet printing composition comprising from 6.50% to 9.50% by weight of at least one pigment, from 4.50% to 7.50% by weight of at least one polymer, from 13.50% to 16.50% by weight of at least one co-solvent, from 0.15% to 0.45% by weight of at least one surfactant, and water, and drying the substrate.

According to yet another aspect, a method of printing comprises providing a substrate, applying an ink jet printing composition to a surface of the substrate, the ink jet printing composition comprising from 6.50% to 9.50% by weight of at least one pigment, from 2.25% to 3.75% by weight of at least one polymer, from 2.25% to 3.75% by weight of at least one opacifier, from 13.50% to 16.50% by weight of at least one co-solvent, from 0.15% to 0.45% by weight of at least one surfactant, and water, and drying the substrate.

According to yet another aspect, a method of printing comprises providing a substrate, applying an ink jet printing composition to a surface of the substrate, the ink jet printing composition comprising from 11.00% to 12.00% by weight of at least one polymer, from 15.50% to 18.50% by weight of at least one co-solvent, from 4.50% to 5.50% by weight of at least one humectant, from 0.35% to 0.65% by weight of at least one surfactant, and water, and drying the substrate.

According to yet another aspect, a method of printing comprises providing a substrate, applying an ink jet printing composition to a surface of the substrate, the ink jet printing composition comprising from 0.40% to 0.60% by weight of at least one optical brightener, from 8.00% to 10.00% by weight of at least one polymer, from 13.50% to 16.50% by weight of at least one co-solvent, from 0.15% to 0.35% by weight of at least one surfactant, from 0.50% to 2.00% by weight of at least one polymer modifier, and water, and drying the substrate.

According to yet another aspect, a method of printing comprises providing a substrate, applying an ink jet printing composition to a surface of the substrate, the ink jet printing composition comprising from 1.00% to 6.00% by weight of at least one pigment, from 4.50% to 8.50% by weight of at least one polymer, from 13.50% to 16.50% by weight of at least one co-solvent, from 0.05% to 0.40% by weight of at least one surfactant, and water, and drying the substrate.

Other aspects and advantages will become apparent upon consideration of the following detailed description and the attached drawings wherein like numerals designate like structures throughout the specification.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

The sole FIG. is a simplified block diagram of an exemplary system for printing images and/or text on a substrate.

DETAILED DESCRIPTION

The FIG. shows an exemplary system 20 for printing content (e.g., images and/or text) on a substrate, such as a shrinkable plastic film used in food grade applications. The system 20 may comprise a stand-alone device that prints monochromatic images, or may be used with other systems, which may be identical to the system 20, to print multiple colors in sequential order. The system 20 may be used to print on any polymeric flexible material that is dimensionally stable or unstable during processing for any application, e.g., either food grade or other than food grade. In one embodiment, the system 20 operates at high-speed, e.g., on the order of zero to 1000 feet per minute (fpm). In one embodiment, the system 20 operates on the order of zero to 500 fpm. In one embodiment, the system 20 operates on the order of zero to 350 fpm although the system may be operable at a different speed, as necessary or desirable.

The illustrated system 20 may be capable of printing images and/or text on one or both sides of a substrate (i.e., the system 20 is capable of simplex and/or duplex printing).

In the illustrated embodiment, a first side of a substrate may be imaged by a sequence of particular units of the system 20 during a first pass. If the system 20 is capable of duplex printing, the substrate is then turned over and the other side of the substrate may be imaged by all of the particular units or only by a subset of the particular units of the system 20 during a second pass.

Further, the illustrated system 20 may comprise a fully digital system that solely utilizes ink jet printers. Ink jet technology offers drop on demand capability, and thus, among other advantages, allows high levels of color control and image customization.

Certain ink jet heads are suitable to apply the high opacity base ink(s) that may be necessary so that other inks printed thereon can receive enough reflected white light. Some printhead technologies are more suitable for white inks as compared to non-white inks due to the attainable drop size and volume, drop velocity and jet straightness, and physical property parameters such as surface tension and viscosity.

Printing on flexible and/or shrinkable films with water-based inks has many challenges and requires fluid management, temperature control, and closed loop processes. Thus, in the present system, for example, the ability to maintain a high-quality color gamut at high speed is further process controlled by sensor(s) that may comprise one or more calibration cameras to fine tune the system continually over the length of large runs.

As used herein, the phrase "heat-shrinkable" is used with reference to films that exhibit a total free shrink (i.e., the sum of the free shrink in both the machine and transverse directions) of at least 10% at 85° C. (185° F.), as measured by ASTM D2732-14 (2020), which is hereby incorporated, in its entirety, by reference herein. All films exhibiting a total free shrink of less than 10% at 85° C. (185° F.) are herein designated as being non-heat-shrinkable. The heat-shrinkable film can have a total free shrink at 85° C. (185° F.) of at least 15%, or at least 20%, or at least 30%, or at least 40%, or at least 45%, or at least 50%, or at least 55%, or at least 60%, or at least 65%, or at least 70%, as measured by ASTM D2732-14 (2020). Heat shrinkability can be achieved by carrying out orientation in the solid state (i.e., at a temperature below the glass transition temperature of the polymer). The total orientation factor employed (i.e., stretching in the transverse direction and drawing in the machine direction) can be any desired factor, such as at least 2×, at least 3×, at least 4×, at least 5×, at least 6×, at least 7×, at least 8×, at least 9×, at least 10×, at least 16×, or from 1.5× to 20×, from 2× to 16×, from 3× to 12×, or from 4× to 9×.

The web 24, which may be polymeric such as a polyolefin web, may be processed by a surface energy modification system, such as a corona treatment unit 26 of conventional type, that increases the surface energy of the web 24. The corona treatment addresses an imaging condition that may be encountered when a large number of closely spaced drops are applied to a low surface energy impermeable material, which, if not compensated for, can result in positional distortion of the applied inks due to coalescence effects. The corona treatment unit 26 may be capable of treating both sides of the web 24 simultaneously. A web guide 28 that may be of conventional type that controls the lateral position of the web 24 in a closed-loop manner guides the corona-treated web 24 to an imager unit 30. A dryer unit 32 is operated to dry the material that is applied to the web 24 by the imager unit 30. The material applied by the imager unit 30 may be deposited over the entirety of the web 24 or may be selectively applied only to portions of the web 24.

The units 30 and 32 are indicated as a first imager unit and a first dryer unit 32 in the FIG. inasmuch as one or more additional optional imager units and/or dryer units may be operable to deposit and/or dry additional material applied to the web 24. These units may be upstream or downstream of the units 30, 32.

The imager unit 30 may include ink jet printheads arranged for applying a single-color ink or multiple color inks, such as primary process color inks CMYK, and/or secondary process color inks orange, violet, and green OVG, and/or an optional spot color ink S to the web 24 at a relatively high resolution. The process colors comprising the CMYK and OVG inks enable reproduction of extended gamut detailed images and high-quality graphics on the web 24.

In an embodiment that uses ink jet technology throughout the system 20, the first imager unit 30 comprising an ink jet printer may optionally apply a clear ink and/or white ink with a dispersion of a white colorant, such as titanium dioxide. One or more downstream units, which may be identical to or different than the imager unit 30 and the dryer unit 32 may thereafter deposit one or more non-white ink(s) onto the web at least in portions that received material from the first imager unit 30.

As should be evident from the foregoing, a printing composition such as an ink formulation may be applied directly to the surface of the web 24 or may be applied atop white or clear ink that has been printed on the web 24 so as to simultaneously enable the adherence of a printed image to the web 24, and provide a chemical interaction with the printed compositions optimizing color fidelity and overall image quality. Furthermore, the printing composition may comprise any colorant, such as a pigment, dye, or any other colorant and/or colorant dispersion(s)/emulsion(s) that may be directly applied to the surface of the web 24 or may be applied atop white or clear ink that has been directly applied to the surface of the web 24.

Printing Composition 1

The printing composition may comprise a water-based ink applied by ink jet to a web 24. This ink jet printing composition, which may be particularly suited as a non-white ink, may comprise at least the following constituents:

- Constituent 1—at least one colorant, which may be a pigment dispersed in at least one dispersion;
- Constituent 2—at least one polymer, which may be dispersed in at least one dispersion, solution or at least one emulsion;
- Constituent 3—at least one co-solvent;
- Constituent 4—at least one humectant;
- Constituent 5—at least one surfactant; and
- Constituent 6—water.

In an exemplary embodiment, a carrier or emulsifier of the at least one pigment dispersion and/or the at least one polymer dispersion and/or the at least one polymer emulsion and/or the polymer solution comprises water, such as deionized water. In an exemplary embodiment, the at least one co-solvent is water miscible and is a solvent or a carrier.

Further, in one embodiment, the printing composition includes from 1.00% to 6.00% by weight of pigment solids and/or an equal weight of solids in at least one pigment dispersion of the total printing composition. In one embodiment, the printing composition includes from 2.00% to 5.00% by weight of pigment solids and/or an equal weight of solids in at least one pigment dispersion of the total printing composition. In one embodiment, the printing composition includes from 3.00% to 4.50% by weight of pigment solids and/or an equal weight of solids in at least one pigment dispersion of the total printing composition.

In one embodiment, the printing composition includes from 5.00% to 11.00% by weight of polymer solids and/or an equal weight of solids in at least one polymer dispersion/emulsion of the total printing composition. In one embodiment, the printing composition includes from 5.50% to 10.50% by weight of polymer solids and/or an equal weight of solids in at least one polymer dispersion/emulsion of the total printing composition. In one embodiment, the printing composition includes from 6.00% to 10.00% by weight of polymer solids and/or an equal weight of solids in at least one polymer dispersion/emulsion of the total printing composition.

In one embodiment that includes two polymers, the printing composition comprises at least 4.50% by weight of solids of a first polymer and/or an equal weight of solids in a first polymer dispersion/emulsion of the total printing composition. In one embodiment that includes two polymers, the printing composition comprises at least 4.75% by weight of solids of a first polymer and/or an equal weight of solids in a first polymer dispersion/emulsion of the total printing composition. In one embodiment that includes two polymers, the printing composition comprises at least 5.00% by weight of solids of a first polymer and/or an equal weight of solids in a first polymer dispersion/emulsion of the total printing composition.

In one embodiment that includes two polymers, the printing composition comprises at least 0.50% by weight of solids of a second polymer and/or an equal weight in a second polymer dispersion/emulsion of the total printing composition. In one embodiment that includes two polymers, the printing composition comprises at least 0.75% by weight of a second polymer and/or an equal weight in a second polymer dispersion/emulsion of the total printing composition. In one embodiment that includes two polymers, the printing composition comprises at least 1.00% by weight of a second polymer and/or an equal weight in a second polymer dispersion/emulsion of the total printing composition.

Pigment solids and/or polymer solids may include at least one solid material, such as a principal material (e.g., carbon black in the case of a pigment or polyurethane in the case of a polymer) and possibly (but not necessarily) at least one additional material (such as a biocide and/or dipropylene glycol in the case of a pigment).

In one embodiment, the printing composition includes from 14.50% to 17.50% by weight of at least one co-solvent of the total printing composition. In one embodiment, the printing composition includes from 14.75% to 17.25% by weight of at least one co-solvent of the total printing composition. In one embodiment, the printing composition includes from 15.00% to 17.00% by weight of at least one co-solvent of the total printing composition.

In one embodiment, the printing composition includes from 4.50% to 5.50% by weight of at least one humectant of the total printing composition. In one embodiment, the printing composition includes from 4.75% to 5.25% by weight of at least one humectant of the total printing composition. In one embodiment, the printing composition includes 5.00% by weight of at least one humectant of the total printing composition.

In one embodiment, the printing composition includes from 1.00% to 2.75% by weight of at least one surfactant of the total printing composition. In one embodiment, the printing composition includes from 1.25% to 2.50% by weight of at least one surfactant of the total printing composition. In one embodiment, the printing composition includes from 1.50% to 2.25% by weight of at least one surfactant of the total printing composition.

In one embodiment, the printing composition comprises four surfactants, wherein the printing composition includes at least 0.035% by weight of a first surfactant, at least 0.75% by weight of a second surfactant, at least 0.15% by weight of a third surfactant, and at least 0.25% by weight of a fourth surfactant of the total printing composition.

In one embodiment, the printing composition includes water, such as deionized water, in addition to any water comprising a part of any dispersion/emulsion, in an amount by weight to sum to 100.00%.

In an exemplary embodiment, the at least one pigment comprises at least one pigment dispersion that is anionic and comprises Pro-Jet™ pigment APD 5000 or Pro-Jet™ pigment APD 1500, available from FujiFilm Imaging Colorants Inc. of New Castle, Delaware. More particularly, the pigment comprises at least one dispersion that may be one or more of primary process color inks such as Pro-Jet™ pigments APD 1000 Cyan dispersion, APD 1000 Magenta dispersion, APD 1000 Yellow dispersion, APD 1500 Cyan dispersion, APD 1500 Magenta dispersion, APD 1500 Yellow dispersion, APD 1500 Black dispersion, and APD 5000 Black dispersion, all available from FujiFilm Imaging Colorants Inc. In alternative embodiments, other pigments comprising dispersions with the same or different pigment strength may be any other primary process color or secondary process color, or at least one spot color pigment compositions, such as food packaging compliant primary process color(s) or secondary process color(s), such as orange, violet, and green, or spot color composition(s). In alternative embodiments, instead of the at least one pigment being in a dispersion, the at least one pigment is solid, granular undissolved, powdered, or any other non-dispersed form, and the at least one pigment dispersion may be a self-dispersible pigment, a dispersant-dispersed pigment, a pigment comprising water-insoluble polymer particles or any other dispersed pigment.

In an exemplary embodiment, the at least one polymer is at least one polymer dispersion and/or at least one polymer emulsion that is anionic and comprises a waterborne polyurethane dispersion ("PUD"), such as NeoRez® R-620, available from Covestro AG, of Leverkusen, Germany. In an exemplary embodiment, the at least one polymer is at least one polymer dispersion and/or at least one polymer emulsion and/or at least one polymer solution that is anionic and comprises resins such as Alberdingk AC 25381 (acrylic-Alberdingk), Lubrijet N240 (acrylic-Lubrizol), Rovene 4119 (styrene butadiene-Mallard Creek Polymers), Rovene 4106 (carboxylated styrene butadiene-Mallard Creek Polymers), Relca HY-288 (self x-linking hybrid copolymer- Stahl), Poly-Pale Rosin (Eastman), AR-565 (acrylic-Sun Polymer). In one embodiment, the at least one polymer is at least one polymer dispersion and/or at least one polymer emulsion comprising Mitsui Takelac™ WPB-341, available from Mitsui Chemicals of Tokyo, Japan. In an exemplary embodiment, the at least one polymer is at least one polymer dispersion and/or at least one polymer emulsion and/or at least one polymer solution that comprises a low-molecular weight polymer, such as a plasticizer that is used for increased flexibility and plasticity (i.e., film toughness) of the printing composition, either alone or combined with one or more other polymers and/or polymer dispersions and/or polymer emulsions and/or at least one polymer solution, such as one or both of NeoRez® R-620 and/or Takelac™ WPB-341 or Alberdingk AC 25381 (acrylic-Alberdingk), Lubrijet N240) (acrylic-Lubrizol), Rovene 4119 (styrene butadiene-Mallard Creek Polymers), Rovene 4106 (carboxylated styrene butadiene-Mallard Creek Polymers), Relca HY-288 (self x-linking hybrid copolymer-Stahl), Poly-Pale Rosin (Eastman), AR-565 (acrylic-Sun Polymer) . . . . In an exemplary embodiment, the plasticizer exists as a liquid and may be derived from or comprise a citric acid ester, such as acetyl tributyl citrate, and comprises Vertellus Citroflex A-4, available from Vertellus Holdings LLC of Indianapolis, Indiana. In a further exemplary embodiment, the plasticizer may be a low VOC benzoic acid-based polymer such as Velsiflex® 318, available from Velsicol Chemical LLC, of Rosemont, Illinois. In another exemplary embodiment, the plasticizer may be Benzoflex™ LA-705, available from Eastman Chemical Company of Kingsport, Tennessee. In an exemplary embodiment, the at least one polymer is at least one polymer dispersion and/or the at least one polymer emulsion and/or at least one polymer solution comprising NeoRez® R-620 and Vertellus Citroflex A-4 or Alberdingk AC 25381 (acrylic-Alberdingk), Lubrijet N240) (acrylic-Lubrizol), Rovene 4119 (styrene butadiene-Mallard Creek Polymers), Rovene 4106 (carboxylated styrene butadiene-Mallard Creek Polymers), Relca HY-288 (self x-linking hybrid copolymer-Stahl), Poly-Pale Rosin (Eastman), AR-565 (acrylic-Sun Polymer) . . . . In an exemplary embodiment, the at least one polymer is at least one polymer dispersion and/or polymer emulsion and/or at least one polymer solution comprising Mitsui Takelac™ WPB-341 and Vertellus Citroflex A-4. In alternative embodiments, the at least one polymer is at least one polymer dispersion and/or at least one polymer emulsion and/or at least one polymer solution comprising NeoRez® R-620 and/or Mitsui Takelac™ WPB-341 and at least one of Velsiflex® 318 and/or Benzoflex™ LA-705. In alternative embodiments, the at least one polymer may be styrene-butadiene based, acrylic based, or any other anionic polymer and/or polymer dispersion and/or polymer emulsion and/or at least one polymer solution, such as a food packaging compliant anionic polymer or polymer dispersion or polymer emulsion and/or at least one polymer solution. In alternative embodiments, the at least one polymer may comprise two or more polymers, which may be dispersions or emulsions, or combination thereof wherein the polymers may individually be anionic or nonionic, but the combination of the polymers is anionic. In an embodiment, each of the at least one pigment and at least one polymer is food packaging compliant. In an exemplary embodiment, each of the at least one pigment and at least one polymer is Swiss Ordinance on Materials and Articles in Contact with Food (SR 817.023.21), Annex 10 (Edition 2.1 of Dec. 1, 2020) compliant.

In an exemplary embodiment, the at least one co-solvent comprises an alcohol-based co-solvent, such as 3-methoxy-3-methyl-1-butanol ("MMB"), available from Kuraray of Okayama, Japan. In alternative embodiments, the at least one co-solvent may be an alcohol-ether, glycol-ether, and/or any other co-solvent or combination thereof miscible in water, and has an evaporation rate lower than water such that the final printing composition, once dried, is less susceptible to water solvency. In an embodiment, the at least one co-solvent is food packaging compliant. In an exemplary embodiment, the at least one co-solvent is Swiss Ordinance on Materials and Articles in Contact with Food (SR 817.023.21), Annex 10 (Edition 2.1 of Dec. 1, 2020) compliant.

In an exemplary embodiment, the at least one humectant is propylene glycol, such as USP propylene glycol. In an embodiment, the at least one humectant may by any other humectant, such as a food packaging compliant humectant. In an exemplary embodiment, the at least one humectant is Swiss Ordinance on Materials and Articles in Contact with Food (SR 817.023.21), Annex 10 (Edition 2.1 of Dec. 1, 2020) compliant.

In an exemplary embodiment, the at least one surfactant may act as at least one of a surface tension reducer and/or a slip additive and/or a stabilizer. In an exemplary embodiment wherein, there are four surfactants, the first surfactant may be a polyether modified polysiloxane compound, such as BYK® 345, available from BYK-Chemie GmbH of Wesel, Germany. Further in such embodiment, the second surfactant may be an ethoxylated acetylenediol based surfactant, such as Surfynol® 420, available from Evonik Industries of Essen, Germany. Still further in this embodiment, the third surfactant may be a dimethylsiloxane-ethylene oxide block copolymer, such as Gelest DBE 921, available from Gelest, Inc. of Morrisville, Pennsylvania, and the fourth surfactant may be a polyether-modified, hydroxy-functional polydimethylsiloxane, such as BYK® 3771, available from BYK-Chemie GmbH. In an alternative embodiment, the at least one surfactant may be any other dimethylsiloxane-ethylene oxide block copolymer, polyether-modified hydroxy-functional polydimethylsiloxane, dimethylsiloxane-ethylene oxide block copolymer, acetylenic diol, siloxane, modified siloxane, or any other surfactant or combination(s) thereof. In an embodiment wherein there are four surfactants, the four surfactants may comprise any one or more of BYK® 347, BYK® 348, BYK® 349, BYK® 3450, and BYK® 3754 all available from BYK-Chemie GmbH, and any one or more of Surfynol® 440, Surfynol® 465, Surfynol® 485, Surfynol® 104 PG 50, and Dynol™ 980, available from Evonik Industries and/or combination(s) thereof. In an embodiment, each of the at least one surfactant is food packaging compliant. In an exemplary embodiment, each of the at least one surfactant is Swiss Ordinance on Materials and Articles in Contact with Food (SR 817.023.21), Annex 10 (Edition 2.1 of Dec. 1, 2020) compliant.

Printing Composition 2

The printing composition may comprise a water-based ink applied by ink jet to a web 24. This ink jet printing composition, which may be particularly suited as a non-white ink, may comprise at least the following constituents:

Constituent 1—at least one colorant, which may be a pigment dispersed in at least one dispersion;

Constituent 2—at least one polymer, which may be dispersed in at least one dispersion, solution or at least one emulsion;

Constituent 3—at least one co-solvent;

Constituent 4—at least one humectant;

Constituent 5—at least one surfactant; and

Constituent 6—water.

In an exemplary embodiment, a carrier or emulsifier of the at least one pigment dispersion and/or the at least one polymer dispersion and/or the at least one polymer emulsion and/or at least one polymer solution comprises water, such as deionized water. In an exemplary embodiment, the at least one co-solvent is water miscible and is a solvent or a carrier.

Further, in one embodiment, the printing composition includes from 1.00% to 6.00% by weight of pigment solids and/or an equal weight of solids in at least one pigment dispersion of the total printing composition. In one embodiment, the printing composition includes from 2.00% to 5.00% by weight of pigment solids and/or an equal weight of solids in at least one pigment dispersion of the total printing composition. In one embodiment, the printing composition includes from 3.00% to 4.50% by weight of pigment solids and/or an equal weight of solids in at least one pigment dispersion of the total printing composition.

In one embodiment, the printing composition includes from 4.50% to 8.50% by weight of polymer solids and/or an equal weight of solids in at least one polymer dispersion/emulsion of the total printing composition. In one embodiment, the printing composition includes from 4.75% to 8.25% by weight of polymer solids and/or an equal weight of solids in at least one polymer dispersion/emulsion of the total printing composition. In one embodiment, the printing composition includes from 5.00% to 8.00% by weight of polymer solids and/or an equal weight of solids in at least one polymer dispersion/emulsion of the total printing composition.

Pigment solids and/or polymer solids may include at least one solid material, such as a principal material (e.g., carbon black in the case of a pigment or polyurethane in the case of a polymer) and possibly (but not necessarily) at least one additional material (such as a biocide and/or dipropylene glycol in the case of a pigment).

In one embodiment, the printing composition includes from 14.50% to 17.50% by weight of at least one co-solvent of the total printing composition. In one embodiment, the printing composition includes from 14.75% to 17.25% by weight of at least one co-solvent of the total printing composition. In one embodiment, the printing composition includes from 15.00% to 17.00% by weight of at least one co-solvent of the total printing composition.

In one embodiment, the printing composition includes from 4.50% to 5.50% by weight of at least one humectant of the total printing composition. In one embodiment, the printing composition includes from 4.75% to 5.25% by weight of at least one humectant of the total printing composition. In one embodiment, the printing composition includes 5.00% by weight of at least one humectant of the total printing composition.

In one embodiment, the printing composition includes from 0.75% to 1.25% by weight of at least one surfactant of the total printing composition. In one embodiment, the printing composition includes from 0.85% to 1.15% by weight of at least one surfactant of the total printing composition. In one embodiment, the printing composition includes from 0.95% to 1.05% by weight of at least one surfactant of the total printing composition.

In one embodiment, the printing composition comprises two surfactants, wherein the printing composition includes at least 0.045% by weight of a first surfactant, and at least 0.75% by weight of a second surfactant of the total printing composition.

In one embodiment, the printing composition comprises three surfactants, wherein the composition includes at least 0.25% by weight of a first surfactant, at least 0.35% by weight of a second surfactant, and at least 0.35% by weight of a third surfactant of the total printing composition.

In one embodiment, the printing composition includes water, such as deionized water, in addition to any water comprising a part of any dispersion/emulsion, in an amount by weight to sum to 100.00%.

In an exemplary embodiment, the at least one pigment comprises at least one pigment dispersion that is anionic and comprises Pro-Jet™ pigment APD 1500 dispersion, available from FujiFilm Imaging Colorants Inc. In an exemplary embodiment the pigment comprises at least one pigment dispersion that comprises Pro-Jet™ pigment APD 5000 Black dispersion, available from FujiFilm Imaging Colorants Inc. In alternative embodiments, other pigments comprising dispersions with the same or different pigment strength may be any other primary process color or secondary process color, or at least one spot color pigment compositions, such as food packaging compliant primary process color(s) or secondary process color(s), such as orange, violet, and green, or spot color composition(s). In alternative embodiments, instead of the at least one pigment being in a dispersion, the at least one pigment is solid, granular undissolved, powdered, or any other non-dispersed form, and the at least one pigment dispersions may be a self-dispersible pigment, a dispersant-dispersed pigment, a pigment comprising water-insoluble polymer particles or any other dispersed pigment.

In an exemplary embodiment, the at least one polymer is at least one polymer dispersion and/or at least one polymer emulsion and/or at least one polymer solution that is anionic and comprises a PUD, such as NeoRez® R-620. In an exemplary embodiment, the at least one polymer is at least one polymer dispersion and/or at least one polymer emulsion and/or at least one polymer solution that is anionic and comprises resins such as Alberdingk AC 25381 (acrylic-Alberdingk), Lubrijet N240 (acrylic-Lubrizol), Rovene 4119 (styrene butadiene-Mallard Creek Polymers), Rovene 4106 (carboxylated styrene butadiene-Mallard Creek Polymers), Relca HY-288 (self x-linking hybrid copolymer-Stahl), Poly-Pale Rosin (Eastman), AR-565 (acrylic-Sun Polymer). In one embodiment, the at least one polymer is least one polymer dispersion and/or at least one polymer emulsion and/or at least one polymer solution comprising Mitsui Takelac™ WPB-341. In alternative embodiments, the at least one polymer may be styrene-butadiene based, acrylic based, or any other anionic polymer and/or polymer dispersion and/or polymer emulsion and/or at least one polymer solution, such as a food packaging compliant anionic polymer or polymer dispersion or polymer emulsion and/or at least one polymer solution. In alternative embodiments, the at least one polymer may comprise two or more polymers, which may be dispersions or emulsions, or combination thereof wherein the polymers may be individually anionic or nonionic, but the combination of the polymers is anionic. In an embodiment, each of the at least one pigment and the at least one polymer is food packaging compliant. In an exemplary embodiment, each of the at least one pigment and the at least one polymer is Swiss Ordinance on Materials and Articles in Contact with Food (SR 817.023.21), Annex 10 (Edition 2.1 of Dec. 1, 2020) compliant.

In an exemplary embodiment, the at least one co-solvent comprises an alcohol-based co-solvent, such as MMB. In alternative embodiments, the at least one co-solvent may be an alcohol-ether, glycol-ether, and/or any other co-solvent or combination thereof miscible in water, and has an evaporation rate lower than water such that the final printing composition, once dried, is less susceptible to water solvency. In an embodiment, the at least one co-solvent is food packaging compliant. In an exemplary embodiment, the at least one co-solvent is Swiss Ordinance on Materials and Articles in Contact with Food (SR 817.023.21), Annex 10 (Edition 2.1 of Dec. 1, 2020) compliant.

In an exemplary embodiment, the at least one humectant is propylene glycol, such as USP propylene glycol. In an embodiment, the at least one humectant may by any other humectant, such as a food packaging compliant humectant. In an exemplary embodiment, the at least one humectant is Swiss Ordinance on Materials and Articles in Contact with Food (SR 817.023.21), Annex 10 (Edition 2.1 of Dec. 1, 2020) compliant.

In an exemplary embodiment, the at least one surfactant may act as at least one of a surface tension reducer and/or a slip additive and/or a stabilizer. In an exemplary embodiment, the at least one surfactant may be a polyether modified polysiloxane compound, such as BYK® 3450, available from BYK-Chemie GmbH. In one embodiment, the at least one surfactant may be an ethoxylated acetylenediol based surfactant such as Surfynol® 440, available from Evonik Industries. In one embodiment, the at least one surfactant may be BYK® 3754. In alternative embodiments, the at least one surfactant may comprise of any acetylenic diol, siloxane, modified siloxane, or any other surfactant(s). The at least one surfactant may comprise such as BYK® 345, BYK® 347, BYK® 348, BYK® 349, BYK® 3754, Surfynol® 440, Surfynol® 465, Surfynol® 485, Surfynol® 104 PG 50, Dynol™ 980, and/or combination(s) thereof. In an embodiment, each of the at least one surfactant is food packaging compliant. In an exemplary embodiment, each of the at least one surfactant is Swiss Ordinance on Materials and Articles in Contact with Food (SR 817.023.21), Annex 10 (Edition 2.1 of Dec. 1, 2020) compliant.

Printing Composition 3

The printing composition may comprise a water-based ink applied by ink jet to a web 24. This ink jet printing composition, which may be particularly suited as a white ink, may comprise at least the following constituents:

- Constituent 1—at least one colorant, which may be a pigment dispersed in at least one dispersion;
- Constituent 2—at least one polymer, which may be dispersed in at least one dispersion, solution or at least one emulsion;
- Constituent 3—at least one co-solvent;
- Constituent 4—at least one surfactant; and
- Constituent 5—water.

In an exemplary embodiment, a carrier or emulsifier of the at least one pigment dispersion and/or the at least one polymer dispersion and/or the at least one polymer emulsion and/or at least one polymer solution comprises water, such as deionized water. In an exemplary embodiment, the at least one co-solvent is water miscible and is a solvent or a carrier.

Further, in one embodiment, the printing composition includes from 6.50% to 9.50% by weight of pigment solids and/or an equal weight of solids in at least one pigment dispersion of the total printing composition. In one embodiment, the printing composition includes from 6.75% to 9.25% by weight of pigment solids and/or an equal weight of solids in at least one pigment dispersion of the total printing composition. In one embodiment, the printing composition includes from 7.00% to 9.00% by weight of pigment solids and/or an equal weight of solids in at least one pigment dispersion of the total printing composition.

In one embodiment, the printing composition includes from 4.50% to 7.50% by weight of polymer solids and/or an equal weight of solids in at least one polymer dispersion/emulsion of the total printing composition. In one embodiment, the printing composition includes from 4.75% to 7.25% by weight of polymer solids and/or an equal weight of solids in at least one polymer dispersion/emulsion of the total printing composition. In one embodiment, the printing composition includes from 5.00% to 7.00% by weight of polymer solids and/or an equal weight of solids in at least one polymer dispersion/emulsion of the total printing composition.

Pigment solids and/or polymer solids may include at least one solid material, such as a principal material (e.g., polyurethane in the case of a polymer) and possibly (but not necessarily) at least one additional material.

In one embodiment, the printing composition includes from 13.50% to 16.50% by weight of at least one co-solvent of the total printing composition. In one embodiment, the printing composition includes from 13.75% to 16.25% by weight of at least one co-solvent of the total printing composition. In one embodiment, the printing composition includes from 14.00% to 16.00% by weight of at least one co-solvent of the total printing composition.

In one embodiment, the printing composition includes from 0.15% to 0.45% by weight of at least one surfactant of the total printing composition. In one embodiment, the printing composition includes from 0.20% to 0.40% by weight of at least one surfactant of the total printing composition. In one embodiment, the printing composition includes from 0.25% to 0.35% by weight of at least one surfactant of the total printing composition.

In one embodiment, the printing composition includes water, such as deionized water, in addition to any water comprising a part of any dispersion/emulsion, in an amount by weight to sum to 100.00%.

In an exemplary embodiment, the at least one pigment comprises at least one pigment dispersion that is anionic and comprises a titanium dioxide pigment, such as Sun D2010-W6-RD White Dispersion, available from Sun Chemical of Parsippany, New Jersey or RMP0182 White Pigment Dispersion available from Vera Inkjet. In alternative embodiments, other pigments comprising dispersions and/or emulsions with the same or different pigment strength may be any other anionic pigment compositions, such as a food packaging compliant anionic pigment composition. In alternative embodiments, instead of the at least one pigment being in a dispersion, the at least one pigment is solid, granular undissolved, powdered, or any other non-dispersed form, and the at least one pigment dispersion may be a self-dispersible pigment, a dispersant-dispersed pigment, a pigment comprising water-insoluble polymer particles or any other dispersed pigment.

In an exemplary embodiment, the at least one polymer is at least one polymer dispersion and/or at least one polymer emulsion and/or at least one polymer solution that is anionic and comprises a PUD, such as NeoRez® R-620. In an exemplary embodiment, the at least one polymer is at least one polymer dispersion and/or at least one polymer emulsion and/or at least one polymer solution that is anionic and comprises resins such as Alberdingk AC 25381 (acrylic-Alberdingk), Lubrijet N240) (acrylic-Lubrizol), Rovene 4119 (styrene butadiene-Mallard Creek Polymers), Rovene 4106 (carboxylated styrene butadiene-Mallard Creek Polymers), Relca HY-288 (self x-linking hybrid copolymer-Stahl), Poly-Pale Rosin (Eastman), AR-565 (acrylic-Sun Polymer). In one embodiment, the at least one polymer is at least one polymer dispersion and/or at least one polymer emulsion and/or at least one polymer solution comprising Takelac™ WPB-341. In alternative embodiments, the at least one polymer may be styrene-butadiene based, acrylic based, or any other anionic polymer and/or polymer dispersion and/or polymer emulsion and/or at least one polymer solution, such as a food packaging compliant anionic polymer or polymer dispersion or polymer emulsion and/or at least one polymer solution. In alternative embodiments, the at least one polymer may comprise two or more polymers, which may be dispersions or emulsions or combination thereof wherein the polymers may be individually anionic or nonionic, but the combination of polymers is anionic. In an embodiment, each of the at least one pigment or the at least one polymer is food packaging compliant. In an exemplary embodiment, each of the at least one pigment or the at least one polymer is Swiss Ordinance on Materials and Articles in Contact with Food (SR 817.023.21), Annex 10 (Edition 2.1 of Dec. 1, 2020) compliant.

In an exemplary embodiment, the at least one co-solvent comprises an alcohol-based co-solvent, such as MMB. In alternative embodiments, the at least one co-solvent may be an alcohol-ether, glycol-ether, and/or any other co-solvent or combination thereof miscible in water, and has an evaporation rate lower than water such that the final printing composition, once dried, is less susceptible to water solvency. In an embodiment, the at least one co-solvent is food packaging compliant. In an exemplary embodiment, the at least one co-solvent is Swiss Ordinance on Materials and Articles in Contact with Food (SR 817.023.21), Annex 10 (Edition 2.1 of Dec. 1, 2020) compliant.

In an exemplary embodiment, the at least one surfactant may act as at least one of a surface tension reducer and/or a slip additive and/or a stabilizer. In an exemplary embodiment, the at least one surfactant may be a polyether modified polysiloxane compound, such as BYK® 345. In alternative embodiments, the at least one surfactant may instead be another acetylenic diol, siloxane, modified siloxane, fluorosurfactant, wax, or any combination thereof that is food packaging compliant. In an exemplary embodiment, the at least one surfactant is Swiss Ordinance on Materials and Articles in Contact with Food (SR 817.023.21), Annex 10 (Edition 2.1 of Dec. 1, 2020) compliant.

Printing Composition 4

The printing composition may comprise a water-based ink applied by ink jet to a web 24. This ink jet printing composition, which may be particularly suited as a white ink, may comprise at least the following constituents:

- Constituent 1—at least one colorant, which may be a pigment dispersed in at least one dispersion;
- Constituent 2—at least one polymer, which may be dispersed in at least one dispersion, solution or at least one emulsion;
- Constituent 3—at least one opacifier, which may be dispersed in at least one dispersion or at least one emulsion;
- Constituent 4—at least one co-solvent;
- Constituent 5—at least one surfactant; and
- Constituent 6—water.

In an exemplary embodiment, a carrier or emulsifier of the at least one pigment dispersion and/or the at least one polymer dispersion and/or the at least one polymer emulsion and/or at least one polymer solution and/or the at least one opacifier dispersion and/or the at least one opacifier emulsion comprises water, such as deionized water. In an exemplary embodiment, the at least one co-solvent is water miscible and is a solvent or a carrier.

Further, in one embodiment, the printing composition includes from 6.50% to 9.50% by weight of pigment solids and/or an equal weight of solids in at least one pigment dispersion of the total printing composition. In one embodiment, the printing composition includes from 6.75% to 9.25% by weight of pigment solids and/or an equal weight of solids in at least one pigment dispersion of the total printing composition. In one embodiment, the printing composition includes from 7.00% to 9.00% by weight of pigment solids and/or an equal weight of solids in at least one pigment dispersion of the total printing composition.

In one embodiment, the printing composition comprises from 2.25% to 3.75% by weight of polymer solids and/or an equal weight of solids in at least one polymer dispersion/emulsion of the total printing composition. In one embodiment, the printing composition includes from 2.37% to 3.63% by weight of polymer solids and/or an equal weight of solids in at least one polymer dispersion/emulsion of the total printing composition. In one embodiment, the printing composition includes from 2.50% to 3.50% by weight of polymer solids and/or an equal weight of solids in at least one polymer dispersion/emulsion of the total printing composition.

In one embodiment, the printing composition includes from 2.25% to 3.75% by weight of opacifier solids and/or an equal weight of solids in at least one opacifier dispersion/emulsion of the total printing composition. In one embodiment, the printing composition includes from 2.37% to 3.63% by weight of opacifier solids and/or an equal weight of solids in at least one opacifier dispersion/emulsion of the total printing composition. In one embodiment, the printing composition includes from 2.50% to 3.50% by weight of opacifier solids and/or an equal weight of solids in at least one opacifier dispersion/emulsion of the total printing composition.

Pigment solids and/or polymer solids and/or opacifier solids may include at least one solid material, such as a principal material (e.g., polyurethane in the case of a polymer) and possibly (but not necessarily) at least one additional material.

In one embodiment, the printing composition includes from 13.50% to 16.50% by weight of at least one co-solvent of the total printing composition. In one embodiment, the printing composition includes from 13.75% to 16.25% by weight of at least one co-solvent of the total printing composition. In one embodiment, the printing composition includes from 14.00% to 16.00% by weight of at least one co-solvent of the total printing composition.

In one embodiment, the printing composition includes from 0.15% to 0.45% by weight of at least one surfactant of the total printing composition. In one embodiment, the printing composition includes from 0.20% to 0.40% by weight of at least one surfactant of the total printing composition. In one embodiment, the printing composition includes from 0.25% to 0.35% by weight of at least one surfactant of the total printing composition.

In one embodiment, the printing composition includes water, such as deionized water, in addition to any water comprising a part of any dispersion/emulsion, in an amount by weight to sum to 100.00%.

In an exemplary embodiment, the at least one pigment comprises at least one pigment dispersion that is anionic and comprises a titanium dioxide pigment, such as Sun D2010-W6-RD White Dispersion, available from Sun Chemical of Parsippany, New Jersey or RMP0182 White Pigment Dispersion available from Vera Inkjet. In alternative embodiments, other pigments comprising dispersions and/or emulsions with the same or different pigment strength may be any other anionic pigment compositions, such as a food packaging compliant anionic pigment composition. In alternative embodiments, instead of the at least one pigment being in a dispersion, the at least one pigment is solid, granular undissolved, powdered, or any other non-dispersed form, and the at least one pigment dispersion may be a self-dispersible pigment, a dispersant-dispersed pigment, a pigment comprising water-insoluble polymer particles or any other dispersed pigment.

In an exemplary embodiment, the at least one polymer is at least one polymer dispersion and/or at least one polymer emulsion and/or at least one polymer solution that is anionic and comprises a PUD, such as NeoRez® R-620, or other resins such as Alberdingk AC 25381 (acrylic-Alberdingk), Lubrijet N240 (acrylic-Lubrizol), Rovene 4119 (styrene butadiene-Mallard Creek Polymers), Rovene 4106 (carboxylated styrene butadiene-Mallard Creek Polymers), Relca HY-288 (self x-linking hybrid copolymer-Stahl), Poly-Pale Rosin (Eastman), AR-565 (acrylic-Sun Polymer). In one embodiment, the at least one polymer is at least one polymer dispersion and/or at least one polymer emulsion and/or at least one polymer solution comprising Takelac™ WPB-341. In alternative embodiments, the at least one polymer may be styrene-butadiene based, acrylic based, or any other anionic polymer and/or polymer dispersion and/or polymer emulsion and/or at least one polymer solution, such as a food packaging compliant anionic polymer or polymer dispersion or polymer emulsion and/or at least one polymer solution. In alternative embodiments, the at least one polymer may comprise two or more polymers, which may be dispersions or emulsions or combination thereof wherein the polymers may be individually anionic or nonionic, but the combination of polymers is anionic. In an embodiment, each of the at least one pigment or the at least one polymer is food packaging compliant. In an exemplary embodiment, each of the at least one pigment or the at least one polymer is Swiss Ordinance on Materials and Articles in Contact with Food (SR 817.023.21), Annex 10 (Edition 2.1 of Dec. 1, 2020) compliant.

In another exemplary embodiment, the at least one opacifier is at least one opacifier dispersion and/or at least one opacifier emulsion, such as AQACell® HIDE 6299 na, available from BASF of Ludwigshafen, Germany. In alternative embodiments, the at least one opacifier may be any other opacifier and/or opacifier dispersion and/or opacifier emulsion, such as a food packaging compliant opacifier or opacifier dispersion or opacifier emulsion. In an exemplary embodiment, the at least one opacifier is Swiss Ordinance on Materials and Articles in Contact with Food (SR 817.023.21), Annex 10 (Edition 2.1 of Dec. 1, 2020) compliant.

In an exemplary embodiment, the at least one co-solvent comprises an alcohol-based co-solvent, such as MMB. In alternative embodiments, the at least one co-solvent may be an alcohol-ether, glycol-ether, and/or any other co-solvent or combination thereof miscible in water, and has an evaporation rate lower than water such that the final printing composition, once dried, is less susceptible to water solvency. In an embodiment, the at least one co-solvent is food packaging compliant. In an exemplary embodiment, the at least one co-solvent is Swiss Ordinance on Materials and Articles in Contact with Food (SR 817.023.21), Annex 10 (Edition 2.1 of Dec. 1, 2020) compliant.

In an exemplary embodiment, the at least one surfactant may act as at least one of a surface tension reducer and/or a slip additive and/or a stabilizer. In an exemplary embodiment, the at least one surfactant may be a polyether modified polysiloxane compound, such as BYK® 348. In alternative embodiments, the at least one surfactant may instead be another acetylenic diol, siloxane, modified siloxane, fluorosurfactant, wax, or any combination thereof that is food packaging compliant. In an exemplary embodiment, the at least one surfactant is Swiss Ordinance on Materials and Articles in Contact with Food (SR 817.023.21), Annex 10 (Edition 2.1 of Dec. 1, 2020) compliant.

Printing Composition 5

The printing composition may comprise a water-based ink applied by ink jet to a web 24. This ink jet printing composition, which may be particularly suited as a clear ink, may comprise at least the following constituents:

Constituent 1—at least one polymer, which may be dispersed in at least one dispersion, solution or at least one emulsion;

Constituent 2—at least one co-solvent;

Constituent 3—at least one humectant;

Constituent 4—at least one surfactant; and

Constituent 5—water.

In an exemplary embodiment, a carrier or emulsifier of the at least one polymer dispersion and/or the at least one polymer emulsion and/or at least one polymer solution comprises water, such as deionized water. In an exemplary embodiment, the at least one co-solvent is water miscible and is a solvent or a carrier.

In one embodiment, the printing composition includes from 11.00% to 12.00% by weight of polymer solids and/or an equal weight of solids in at least one polymer/emulsion of the total printing composition. In one embodiment, the printing composition includes from 11.25% to 11.75% by weight of polymer solids and/or an equal weight of solids in at least one polymer dispersion/emulsion of the total printing composition. In one embodiment, the printing composition includes 11.50% by weight of polymer solids and/or an equal weight in at least one polymer dispersion/emulsion of the total printing composition.

Polymer solids may include at least one solid material, such as a principal material (e.g., polyurethane in the case of a polymer) and possibly (but not necessarily) at least one additional material.

In one embodiment, the printing composition includes from 15.50% to 18.50% by weight of at least one co-solvent of the total printing composition. In one embodiment, the printing composition includes from 15.75% to 18.25% by weight of at least one co-solvent of the total printing composition. In one embodiment, the printing composition includes from 16.00% to 18.00% by weight of at least one co-solvent of the total printing composition.

In one embodiment, the printing composition includes from 4.50% to 5.50% by weight of at least one humectant of the total printing composition. In one embodiment, the printing composition includes from 4.75% to 5.25% by weight of at least one humectant of the total printing composition. In one embodiment, the printing composition includes 5.00% by weight of at least one humectant of the total printing composition.

In one embodiment, the printing composition includes from 0.35% to 0.65% by weight of at least one surfactant of the total printing composition. In one embodiment, the printing composition includes from 0.40% to 0.60% by weight of at least one surfactant of the total printing composition. In one embodiment, the printing composition includes from 0.45% to 0.55% by weight of at least one surfactant of the total printing composition.

In one embodiment, the printing composition includes water, such as deionized water, in addition to any water comprising a part of any dispersion/emulsion, in an amount by weight to sum to 100.00%.

In an exemplary embodiment, the at least one polymer is at least one polymer dispersion and/or at least one polymer emulsion and/or at least one polymer solution that is anionic and comprises a PUD, such as NeoRez® R-620, or other resins Alberdingk AC 25381 (acrylic-Alberdingk), Lubrijet N240) (acrylic-Lubrizol), Rovene 4119 (styrene butadiene-Mallard Creek Polymers), Rovene 4106 (carboxylated styrene butadiene-Mallard Creek Polymers), Relca HY-288 (self x-linking hybrid copolymer-Stahl), Poly-Pale Rosin (Eastman), AR-565 (acrylic-Sun Polymer). In alternative embodiments, the at least one polymer is at least one polymer dispersion and/or at least one polymer emulsion and/or at least one polymer solution comprising NeoRez® R-605, available from Covestro AG, or other resins Alberdingk AC 25381 (acrylic-Alberdingk), Lubrijet N240 (acrylic-Lubrizol), Rovene 4119 (styrene butadiene-Mallard Creek Polymers), Rovene 4106 (carboxylated styrene butadiene-Mallard Creek Polymers), Relca HY-288 (self x-linking hybrid copolymer-Stahl), Poly-Pale Rosin (Eastman), AR-565 (acrylic-Sun Polymer). In one embodiment, the at least one polymer is at least one polymer dispersion and/or the at least one polymer emulsion and/or at least one polymer solution comprising a self-crosslinking acrylic copolymer emulsion and/or at least one polymer solution, such as Neocryl® A-1127, available from Covestro AG. In alternative embodiments, the at least one polymer may be styrene-butadiene based, acrylic based, or any other anionic polymer or polymer dispersion or polymer emulsion and/or at least one polymer solution, such as food packaging compliant anionic polymer or polymer dispersion or polymer emulsion and/or at least one polymer solution. In alternative embodiments, the at least one polymer may comprise two or more polymers, which may be dispersions and/or emulsions or combination thereof wherein the polymers may be any combination of NeoRez® R-620, NeoRez® R-605, and Neocryl® A-1127., or other resins such as Alberdingk AC 25381 (acrylic-Alberdingk), Lubrijet N240) (acrylic-Lubrizol), Rovene 4119 (styrene butadiene-Mallard Creek Polymers), Rovene 4106 (carboxylated styrene butadiene-Mallard Creek Polymers), Relca HY-288 (self x-linking hybrid copolymer-Stahl), Poly-Pale Rosin (Eastman), AR-565 (acrylic-Sun Polymer) or may be any other combination of polymers wherein the polymers may be individually anionic or nonionic but the combination of polymers is anionic. In an embodiment, each of the at least one polymer is food packaging compliant. In an exemplary embodiment, each of the at least one polymer is Swiss Ordinance on Materials and Articles in Contact with Food (SR 817.023.21), Annex 10 (Edition 2.1 of Dec. 1, 2020) compliant.

In an exemplary embodiment, the at least one co-solvent comprises an alcohol-based co-solvent, such as MMB. In alternative embodiments, the at least one co-solvent may be an alcohol-ether, glycol-ether, and/or any other co-solvent or combination thereof miscible in water, and has an evaporation rate lower than water such that the final printing composition, once dried, is less susceptible to water solvency. In an embodiment, the at least one co-solvent is food packaging compliant. In an exemplary embodiment, the at least one co-solvent is Swiss Ordinance on Materials and Articles in Contact with Food (SR 817.023.21), Annex 10 (Edition 2.1 of Dec. 1, 2020) compliant.

In an exemplary embodiment, the at least one humectant is propylene glycol, such as USP propylene glycol. In an embodiment, the at least one humectant may by any other humectant, such as a food packaging compliant humectant. In an exemplary embodiment, the at least one humectant is Swiss Ordinance on Materials and Articles in Contact with Food (SR 817.023.21), Annex 10 (Edition 2.1 of Dec. 1, 2020) compliant.

In an exemplary embodiment, the at least one surfactant may act as at least one of a surface tension reducer and/or a slip additive and/or a stabilizer. In an exemplary embodiment, the at least one surfactant is a polyether modified polysiloxane compound, such as BYK® 345. In an alternative embodiment, the at least one surfactant may be any other modified polysiloxane compound, or any other surfactant or combination thereof. In an embodiment, the at least one surfactant may comprise BYK® 347, BYK® 348, BYK® 349, BYK® 3754, BYK® 3771, Surfynol® 440, Surfynol® 465, Surfynol® 485, Surfynol® 104 PG 50, Dynol™ 980 and/or combination(s) thereof. In an embodiment, each of the at least one surfactant is food packaging compliant. In an exemplary embodiment, each of the at least one surfactant is Swiss Ordinance on Materials and Articles in Contact with Food (SR 817.023.21), Annex 10 (Edition 2.1 of Dec. 1, 2020) compliant.

Printing Composition 6

The printing composition may comprise a water-based ink applied by ink jet to a web 24. This ink jet printing composition, which may be particularly suited as a clear ink, may comprise the following constituents:

- Constituent 1—at least one optical brightener, which may be dispersed in at least one dispersion;
- Constituent 2—at least one polymer, which may be dispersed in at least one dispersion, solution or at least one emulsion;
- Constituent 3—at least one co-solvent;
- Constituent 4—at least one surfactant;
- Constituent 5—at least one polymer modifier, which may be dispersed in at least one dispersion; and
- Constituent 6—water.

In an exemplary embodiment, a carrier or emulsifier of the at least one optical brightener dispersion and/or the at least one polymer dispersion and/or the at least one polymer emulsion and/or at least one polymer solution and/or the at least one polymer modifier dispersion comprises water, such as deionized water. In an exemplary embodiment, the at least one co-solvent is water miscible and is a solvent or a carrier.

Further, in one embodiment, the printing composition includes from 0.40% to 0.60% by weight of optical brightener solids and/or an equal weight of solids in at least one optical brightener dispersion of the total printing composition. In one embodiment, the printing composition includes from 0.45% to 0.55% by weight of optical brightener solids and/or an equal weight of solids in at least one optical brightener dispersion of the total printing composition. In one embodiment, the printing composition includes 0.50% by weight of optical brightener solids and/or an equal weight of solids in at least one optical brightener dispersion of the total printing composition.

In one embodiment, the printing composition includes from 8.00% to 10.00% by weight of polymer solids and/or an equal weight of solids in at least one polymer dispersion/emulsion of the total printing composition. In one embodiment, the printing composition includes from 8.25% to 9.75% by weight of polymer solids and/or an equal weight of solids in at least one polymer dispersion/emulsion of the total printing composition. In one embodiment, the printing composition includes from 8.50% to 9.50% by weight of polymer solids and/or an equal weight of solids in at least one polymer dispersion/emulsion of the total printing composition.

In one embodiment, the printing composition includes from 13.50% to 16.50% by weight of at least one co-solvent of the total printing composition. In one embodiment, the printing composition includes from 13.75% to 16.25% by weight of at least one co-solvent of the total printing composition. In one embodiment, the printing composition includes from 14.00% to 16.00% by weight of at least one co-solvent of the total printing composition.

In one embodiment, the printing composition includes from 0.15% to 0.35% by weight of at least one surfactant of the total printing composition. In one embodiment, the printing composition includes from 0.20% to 0.30% by weight of at least one surfactant of the total printing composition. In one embodiment, the printing composition includes 0.25% by weight of at least one surfactant of the total printing composition.

In one embodiment, the printing composition includes from 0.50% to 2.00% by weight of polymer modifier solids and/or an equal weight of solids in at least one polymer modifier dispersion of the total printing composition. In one embodiment, the printing composition includes from 0.75% to 1.75% by weight of polymer modifier solids and/or an equal weight of solids in at least one polymer modifier dispersion of the total printing composition. In one embodiment, the printing composition includes from 1.00% to 1.50% by weight of polymer modifier solids and/or an equal weight of solids in at least one polymer modifier dispersion of the total printing composition.

Optical brightener solids and/or polymer solids and/or polymer modifier solids may include at least one solid material, such as a principal material (e.g., polyurethane in the case of a polymer) and possibly (but not necessarily) at least one additional material.

In one embodiment, the printing composition includes water, such as deionized water, in addition to any water comprising a part of any dispersion/emulsion, in an amount by weight to sum to 100.00%.

In an exemplary embodiment, the at least one optical brightener comprises at least one optical brightener dispersion, such as Sarchem CBS-X Optical Brightener C.I. 351), available from Sarchem Laboratories, Inc. of Farmingdale, New Jersey or D-282 UV Blue Water Soluble Dye available from Dayglo. In an embodiment, the at least one optical brightener may be any other water stable or water-soluble optical brightener that is food packaging compliant. In an exemplary embodiment, the at least one optical brightener is Swiss Ordinance on Materials and Articles in Contact with Food (SR 817.023.21), Annex 10 (Edition 2.1 of Dec. 1, 2020) compliant.

In an exemplary embodiment, the at least one polymer is at least one polymer dispersion and/or at least one polymer emulsion and/or at least one polymer solution that is anionic and comprises a PUD, such as Takelac™ WPB-341. In one embodiment, the at least one polymer is at least one polymer dispersion and/or at least one polymer emulsion and/or at least one polymer solution comprising NeoRez® R-620, or other resins Alberdingk AC 25381 (acrylic-Alberdingk), Lubrijet N240 (acrylic-Lubrizol), Rovene 4119 (styrene butadiene-Mallard Creek Polymers), Rovene 4106 (carboxylated styrene butadiene-Mallard Creek Polymers), Relca HY-288 (self x-linking hybrid copolymer-Stahl), Poly-Pale Rosin (Eastman), AR-565 (acrylic-Sun Polymer). In alternative embodiments, the at least one polymer may be styrene-butadiene based, or acrylic based, or any other anionic polymer and/or polymer dispersion and/or polymer emulsion and/or at least one polymer solution, such as a food packaging compliant anionic polymer or polymer dispersion or polymer emulsion and/or at least one polymer solution. In alternative embodiments, the at least one polymer may comprise two or more polymers, which may be dispersions or emulsions or combination thereof wherein the polymers may be individually anionic or nonionic, but the combination of polymers is anionic. In an embodiment, each of the at least one polymer is food packaging compliant. In an exemplary embodiment, each of the at least one polymer is Swiss Ordinance on Materials and Articles in Contact with Food (SR 817.023.21), Annex 10 (Edition 2.1 of Dec. 1, 2020) compliant.

In an exemplary embodiment, the at least one co-solvent comprises an alcohol-based co-solvent, such as MMB. In alternative embodiments, the at least one co-solvent may be an alcohol-ether, glycol-ether, and/or any other co-solvent or combination thereof miscible in water, and has an evaporation rate lower than water such that the final printing composition, once dried, is less susceptible to water solvency. In an embodiment, the at least one co-solvent is food packaging compliant. In an exemplary embodiment, the at least one co-solvent is Swiss Ordinance on Materials and Articles in Contact with Food (SR 817.023.21), Annex 10 (Edition 2.1 of Dec. 1, 2020) compliant.

In an exemplary embodiment, the at least one surfactant may act as at least one of a surface tension reducer and/or a slip additive and/or a stabilizer. In an exemplary embodiment, the at least one surfactant is a polyether modified polysiloxane compound, such as BYK® 345. In an alternative embodiment, the at least one surfactant may be any other modified polysiloxane compound, or any other surfactant(s) or combination(s) thereof such as BYK® 347, BYK® 348, BYK® 349, BYK® 3754, BYK® 3771, Surfynol® 440, Surfynol® 465, Surfynol® 485, Surfynol® 104 PG 50, Dynol™ 980. In an embodiment, each of the at least one surfactant is food packaging compliant. In an exemplary embodiment, each of the at least one surfactant is Swiss Ordinance on Materials and Articles in Contact with Food (SR 817.023.21), Annex 10 (Edition 2.1 of Dec. 1, 2020) compliant.

In an exemplary embodiment, the at least one polymer modifier is at least one polymer modifier dispersion comprising an acrylic rheological additive, such as Rheolate® 125, available from Elementis of London, United Kingdom. In an exemplary embodiment, the at least one polymer modifier is at least one polymer modifier dispersion comprising dimethylethanolamine ("DMEA"). In an exemplary embodiment the at least one polymer modifier is at least one polymer modifier dispersion comprising Rheolate® 125 and DMEA. In an alternative embodiment, the at least one polymer modifier is any other polymer modifier. In an embodiment, the at least one polymer modifier is food packaging compliant. In an exemplary embodiment, the at least one polymer modifier is Swiss Ordinance on Materials and Articles in Contact with Food (SR 817.023.21), Annex 10 (Edition 2.1 of Dec. 1, 2020) compliant.

Printing Composition 7

The printing composition may comprise a water-based ink applied by ink jet to a web 24. This ink jet printing composition, which may be particularly suited as a non-white ink, may comprise at least the following constituents:

Constituent 1—at least one colorant, which may be a pigment dispersed in at least one dispersion;

Constituent 2—at least one polymer, which may be dispersed in at least one dispersion, solution or at least one emulsion;

Constituent 3—at least one co-solvent;

Constituent 4—at least one surfactant; and

Constituent 5—water.

In an exemplary embodiment, a carrier or emulsifier of the at least one pigment dispersion and/or the at least one polymer dispersion and/or the at least one polymer emulsion and/or at least one polymer solution comprises water, such as deionized water. In an exemplary embodiment, the at least one co-solvent is water miscible and is a solvent or a carrier.

Further, in one embodiment, the printing composition includes from 1.00% to 6.00% by weight of pigment solids and/or an equal weight of solids in at least one pigment dispersion of the total printing composition. In one embodiment, the printing composition includes from 2.00% to 5.00% by weight of pigment solids and/or an equal weight of solids in at least one pigment dispersion of the total printing composition. In one embodiment, the printing composition includes from 3.00% to 4.50% by weight of pigment solids and/or an equal weight of solids in at least one pigment dispersion of the total printing composition.

In one embodiment, the printing composition comprises from 4.50% to 8.50% by weight of polymer solids and/or an equal weight of solids in at least one polymer dispersion/emulsion of the total printing composition. In one embodiment, the printing composition comprises from 4.75% to 8.25% by weight of polymer solids and/or an equal weight of solids in at least one polymer dispersion/emulsion of the total printing composition. In one embodiment, the printing composition comprises from 5.00% to 8.00% by weight of polymer solids and/or an equal weight of solids in at least one polymer dispersion/emulsion of the total printing composition.

Pigment solids and/or polymer solids may include at least one solid material, such as a principal material (e.g., carbon black in the case of a pigment or polyurethane in the case of a polymer) and possibly (but not necessarily) at least one additional material (such as a biocide and/or dipropylene glycol in the case of a pigment).

In one embodiment, the printing composition includes from 13.50% to 16.50% by weight of at least one co-solvent of the total printing composition. In one embodiment, the printing composition includes from 13.75% to 16.25% by weight of at least one co-solvent of the total printing composition. In one embodiment, the printing composition includes from 14.00% to 16.00% by weight of at least one co-solvent of the total printing composition.

In one embodiment, the printing composition includes from 0.05% to 0.40% by weight of at least one surfactant of the total printing composition. In one embodiment, the printing composition includes from 0.05% to 0.35% by weight of at least one surfactant of the total printing composition. In one embodiment, the printing composition includes from 0.05% to 0.30% by weight of at least one surfactant of the total printing composition.

In one embodiment, the printing composition includes water, such as deionized water, in addition to any water comprising a part of any dispersion/emulsion, in an amount by weight to sum to 100.00%.

In an exemplary embodiment, the at least one pigment comprises at least one pigment dispersion that is anionic and comprises Pro-Jet™ pigment APD 5000, available from FujiFilm Imaging Colorants Inc. In an alternative embodiment, the pigment comprises at least one dispersion that may be one or more of primary process color inks such as Pro-Jet™ pigments APD 1000 Cyan dispersion, APD 1000 Magenta dispersion, APD 1000 APD 1500 Cyan dispersion, APD 1500 Magenta dispersion, or APD 1500 Yellow dispersion Yellow dispersion, all available from FujiFilm Imaging Colorants Inc. In alternative embodiments, other pigments comprising dispersions with the same or different pigment strength may be any other primary process color or secondary process color, or at least one spot color pigment compositions, such as food packaging compliant primary process color(s) or secondary process color(s), such as orange, violet, and green, or spot color composition(s). In alternative embodiments, instead of the at least one pigment being in a dispersion, the at least one pigment is solid, granular undissolved, powdered, or any other non-dispersed form, and the at least one pigment dispersions may be a self-dispersible pigment, a dispersant-dispersed pigment, a pigment comprising water-insoluble polymer particles or any other dispersed pigment.

In an exemplary embodiment, the at least one polymer is at least one polymer dispersion and/or the at least one polymer emulsion and/or at least one polymer solution that is anionic and comprises a PUD, such as Mitsui Takelac™ WPB-341. In one embodiment, the at least one polymer is at least one polymer dispersion and/or at least one polymer emulsion and/or at least one polymer solution comprising NeoRez® R-620, or other resins Alberdingk AC 25381 (acrylic-Alberdingk), Lubrijet N240 (acrylic-Lubrizol), Rovene 4119 (styrene butadiene-Mallard Creek Polymers), Rovene 4106 (carboxylated styrene butadiene-Mallard Creek Polymers), Relca HY-288 (self x-linking hybrid copolymer-Stahl), Poly-Pale Rosin (Eastman), AR-565 (acrylic-Sun Polymer). In alternative embodiments, the at least one polymer may be styrene-butadiene based, acrylic based, or any other anionic polymer and/or polymer dispersion and/or polymer emulsion and/or at least one polymer solution, such as a food packaging compliant anionic polymer or polymer dispersion or polymer emulsion and/or at least one polymer solution. In alternative embodiments, the at least one polymer may comprise two or more polymers, which may be dispersions or emulsions or combination thereof wherein the polymers may individually be anionic or nonionic, but the combination of polymers is anionic. In an embodiment, each of the at least one pigment and the at least one polymer is food packaging compliant. In an exemplary embodiment, each of the at least one pigment and the at least one polymer is Swiss Ordinance on Materials and Articles in Contact with Food (SR 817.023.21), Annex 10 (Edition 2.1 of Dec. 1, 2020) compliant.

In an exemplary embodiment, the at least one co-solvent comprises an alcohol-based co-solvent, such as MMB. In alternative embodiments, the at least one co-solvent may be an alcohol-ether, glycol-ether, and/or any other co-solvent or combination thereof miscible in water, and has an evaporation rate lower than water such that the final printing composition, once dried, is less susceptible to water solvency. In an embodiment, the at least one co-solvent is food packaging compliant. In an exemplary embodiment, the at least one co-solvent is Swiss Ordinance on Materials and Articles in Contact with Food (SR 817.023.21), Annex 10 (Edition 2.1 of Dec. 1, 2020) compliant.

In an exemplary embodiment, the at least one surfactant may act as at least one of a surface tension reducer and/or a slip additive and/or a stabilizer. In an exemplary embodiment, the at least one surfactant may be a polyether modified polysiloxane compound, such as BYK® 345. In an alternative embodiment, the at least one surfactant may be any other polyether modified polysiloxane compound, or any other surfactant or combination(s) thereof. In an embodiment, the at least one surfactant may comprise BYK® 347, BYK® 348, BYK® 349, BYK® 3450, BYK® 3754 available from BYK-Chemie GmbH, Surfynol® 440, Surfynol® 465, Surfynol® 485, Surfynol® 104 PG 50, Dynol™ 980, available from Evonik Industries and/or combination(s) thereof. In an embodiment, each of the at least one surfactant is food packaging compliant. In an exemplary embodiment, each of the at least one surfactant is Swiss Ordinance on Materials and Articles in Contact with Food (SR 817.023.21), Annex 10 (Edition 2.1 of Dec. 1, 2020) compliant.

Printing Composition 8

The printing composition may comprise a water-based ink applied by ink jet to a web 24. This ink jet printing composition, which may be particularly suited as a non-white ink, may comprise at least the following constituents:

- Constituent 1—at least one colorant, which may be a pigment dispersed in at least one dispersion;
- Constituent 2—at least one polymer, which may be dispersed in at least one dispersion, solution or at least one emulsion;
- Constituent 3—at least one co-solvent;
- Constituent 4—at least one humectant;
- Constituent 5—at least one emulsifier;
- Constituent 6—at least one surfactant; and
- Constituent 7—water.

In an exemplary embodiment, a carrier or emulsifier of the at least one pigment dispersion and/or the at least one polymer dispersion and/or the at least one polymer emulsion and/or at least one polymer solution comprises water, such as deionized water. In an exemplary embodiment, the at least one co-solvent is water miscible and is a solvent or a carrier.

Further, in one embodiment, the printing composition includes from 1.00% to 6.00% by weight of pigment solids and/or an equal weight of solids in at least one pigment dispersion of the total printing composition. In one embodiment, the printing composition includes from 2.00% to 5.00% by weight of pigment solids and/or an equal weight of solids in at least one pigment dispersion of the total printing composition. In one embodiment, the printing composition includes from 3.00% to 4.50% by weight of pigment solids and/or an equal weight of solids in at least one pigment dispersion of the total printing composition.

In one embodiment, the printing composition includes from 5.00% to 11.00% by weight of polymer solids and/or an equal weight of solids in at least one polymer dispersion/emulsion of the total printing composition. In one embodiment, the printing composition includes from 5.50% to 10.50% by weight of polymer solids and/or an equal weight of solids in at least one polymer dispersion/emulsion of the total printing composition. In one embodiment, the printing composition includes from 6.00% to 10.00% by weight of polymer solids and/or an equal weight of solids in at least one polymer dispersion/emulsion of the total printing composition.

In one embodiment that includes two polymers, the printing composition comprises at least 4.50% by weight of solids of a first polymer and/or an equal weight of solids in a first polymer dispersion/emulsion of the total printing composition. In one embodiment that includes two polymers, the printing composition comprises at least 4.75% by weight of solids of a first polymer and/or an equal weight of solids in a first polymer dispersion/emulsion of the total printing composition. In one embodiment that includes two polymers, the printing composition comprises at least 5.00% by weight of solids of a first polymer and/or an equal weight of solids in a first polymer dispersion/emulsion of the total printing composition.

In one embodiment that includes two polymers, the printing composition comprises at least 0.50% by weight of solids of a second polymer and/or an equal weight in a second polymer dispersion/emulsion of the total printing composition. In one embodiment that includes two polymers, the printing composition comprises at least 0.75% by weight of a second polymer and/or an equal weight in a second polymer dispersion/emulsion of the total printing composition. In one embodiment that includes two polymers, the printing composition comprises at least 1.00% by weight of a second polymer and/or an equal weight in a second polymer dispersion/emulsion of the total printing composition.

Pigment solids and/or polymer solids may include at least one solid material, such as a principal material (e.g., carbon black in the case of a pigment or polyurethane in the case of a polymer) and possibly (but not necessarily) at least one additional material (such as a biocide and/or dipropylene glycol in the case of a pigment).

In one embodiment, the printing composition includes from 14.50% to 17.50% by weight of at least one co-solvent of the total printing composition. In one embodiment, the printing composition includes from 14.75% to 17.25% by weight of at least one co-solvent of the total printing composition. In one embodiment, the printing composition includes from 15.00% to 17.00% by weight of at least one co-solvent of the total printing composition.

In one embodiment, the printing composition includes from 4.50% to 5.50% by weight of at least one humectant of the total printing composition. In one embodiment, the printing composition includes from 4.75% to 5.25% by weight of at least one humectant of the total printing composition. In one embodiment, the printing composition includes 5.00% by weight of at least one humectant of the total printing composition.

In one embodiment, the printing composition includes from 0.10% to 0.50% by weight of at least one emulsifier of the total printing composition. In one embodiment, the printing composition includes from 0.15% to 0.45% by weight of at least one emulsifier of the total printing composition.

In one embodiment, the printing composition includes from 1.00% to 2.75% by weight of at least one surfactant of the total printing composition. In one embodiment, the printing composition includes from 1.25% to 2.50% by weight of at least one surfactant of the total printing composition. In one embodiment, the printing composition includes from 1.50% to 2.25% by weight of at least one surfactant of the total printing composition.

In one embodiment, the printing composition comprises four surfactants, wherein the printing composition includes at least 0.035% by weight of a first surfactant, at least 0.75% by weight of a second surfactant, at least 0.15% by weight of a third surfactant, and at least 0.25% by weight of a fourth surfactant of the total printing composition.

In one embodiment, the printing composition includes water, such as deionized water, in addition to any water comprising a part of any dispersion/emulsion, in an amount by weight to sum to 100.00%.

In an exemplary embodiment, the at least one pigment comprises at least one pigment dispersion that is anionic and comprises Pro-Jet™ pigment APD 5000 or Pro-Jet™ pigment APD 1500, available from FujiFilm Imaging Colorants Inc. of New Castle, Delaware. More particularly, the pigment comprises at least one dispersion that may be one or more of primary process color inks such as Pro-Jet™ pigments APD 1000 Cyan dispersion, APD 1000 Magenta dispersion, APD 1000 Yellow dispersion, APD 1500 Cyan dispersion, APD 1500 Magenta dispersion, APD 1500 Yellow dispersion, APD 1500 Black dispersion, and APD 5000 Black dispersion, all available from FujiFilm Imaging Colorants Inc. In alternative embodiments, other pigments comprising dispersions with the same or different pigment strength may be any other primary process color or secondary process color, or at least one spot color pigment compositions, such as food packaging compliant primary process color(s) or secondary process color(s), such as orange, violet, and green, or spot color composition(s). In alternative embodiments, instead of the at least one pigment being in a dispersion, the at least one pigment is solid, granular undissolved, powdered, or any other non-dispersed form, and the at least one pigment dispersion may be a self-dispersible pigment, a dispersant-dispersed pigment, a pigment comprising water-insoluble polymer particles or any other dispersed pigment.

In an exemplary embodiment, the at least one polymer is at least one polymer dispersion and/or at least one polymer emulsion and/or at least one polymer solution that is anionic and comprises a waterborne polyurethane dispersion ("PUD"), such as NeoRez® R-620, available from Covestro AG, of Leverkusen, Germany. In an exemplary embodiment, the at least one polymer is at least one polymer dispersion and/or at least one polymer emulsion and/or at least one polymer solution that is anionic and comprises resins such as Alberdingk AC 25381 (acrylic-Alberdingk), Lubrijet N240 (acrylic-Lubrizol), Rovene 4119 (styrene butadiene-Mallard Creek Polymers), Rovene 4106 (carboxylated styrene butadiene-Mallard Creek Polymers), Relca HY-288 (self x-linking hybrid copolymer-Stahl), Poly-Pale Rosin (Eastman), AR-565 (acrylic-Sun Polymer). In one embodiment, the at least one polymer is at least one polymer dispersion and/or at least one polymer emulsion and/or at least one polymer solution comprising Mitsui Takelac™ WPB-341, available from Mitsui Chemicals of Tokyo, Japan. In an exemplary embodiment, the at least one polymer is at least one polymer dispersion and/or at least one polymer emulsion and/or at least one polymer solution that comprises a low-molecular weight polymer, such as a plasticizer that is used for increased flexibility and plasticity (i.e., film toughness) of the printing composition, either alone or combined with one or more other polymers and/or polymer dispersions and/or polymer emulsions and/or at least one polymer solutions, such as one or both of NeoRez® R-620) and/or Takelac™ WPB-341 or Alberdingk AC 25381 (acrylic-Alberdingk), Lubrijet N240) (acrylic-Lubrizol), Rovene 4119 (styrene butadiene-Mallard Creek Polymers), Rovene 4106 (carboxylated styrene butadiene-Mallard Creek Polymers), Relca HY-288 (self x-linking hybrid copolymer-Stahl), Poly-Pale Rosin (Eastman), AR-565 (acrylic-Sun Polymer). In an exemplary embodiment, the plasticizer exists as a liquid and may be derived from or comprise a citric acid ester, such as acetyl tributyl citrate, and comprises Vertellus Citroflex A-4, available from Vertellus Holdings LLC of Indianapolis, Indiana. In a further exemplary embodiment, the plasticizer may be a low VOC benzoic acid-based polymer such as Velsiflex® 318, available from Velsicol Chemical LLC, of Rosemont, Illinois. In another exemplary embodiment, the plasticizer may be Benzoflex™ LA-705, available from Eastman Chemical Company of Kingsport, Tennessee. In an exemplary embodiment, the at least one polymer is at least one polymer dispersion and/or the at least one polymer emulsion and/or at least one polymer solution comprising NeoRez® R-620 and Vertellus Citroflex A- or resins such as Alberdingk AC 25381 (acrylic-Alberdingk), Lubrijet N240) (acrylic-Lubrizol), Rovene 4119 (styrene butadiene-Mallard Creek Polymers), Rovene 4106 (carboxylated styrene butadiene-Mallard Creek Polymers), Relca HY-288 (self x-linking hybrid copolymer-Stahl), Poly-Pale Rosin (Eastman), AR-565 (acrylic-Sun Polymer) . . . . In an exemplary embodiment, the at least one polymer is at least one polymer dispersion and/or polymer emulsion and/or at least one polymer solution comprising Mitsui Takelac™ WPB-341 and Vertellus Citroflex A-4. In alternative embodiments, the at least one polymer is at least one polymer dispersion and/or at least one polymer emulsion and/or at least one polymer solution comprising NeoRez® R-620 and/or Mitsui Takelac™ WPB-341 and at least one of Velsiflex® 318 and/or Benzoflex™ LA-705. In alternative embodiments, the at least one polymer may be styrene-butadiene based, acrylic based, or any other anionic polymer and/or polymer dispersion and/or polymer emulsion and/or at least one polymer solution, such as a food packaging compliant anionic polymer or polymer dispersion or polymer emulsion and/or at least one polymer solution. In alternative embodiments, the at least one polymer may comprise two or more polymers, which may be dispersions or emulsions, or combination thereof wherein the polymers may individually be anionic or nonionic, but the combination of the polymers is anionic. In an embodiment, each of the at least one pigment and at least one polymer is food packaging compliant. In an exemplary embodiment, each of the at least one pigment and at least one polymer is Swiss Ordinance on Materials and Articles in Contact with Food (SR 817.023.21), Annex 10 (Edition 2.1 of Dec. 1, 2020) compliant.

In an exemplary embodiment, the at least one co-solvent comprises an alcohol-based co-solvent, such as 3-methoxy-3-methyl-1-butanol ("MMB"), available from Kuraray of Okayama, Japan. In alternative embodiments, the at least one co-solvent may be an alcohol-ether, glycol-ether, and/or any other co-solvent or combination thereof miscible in water, and has an evaporation rate lower than water such that the final printing composition, once dried, is less susceptible to water solvency. In an embodiment, the at least one co-solvent is food packaging compliant. In an exemplary embodiment, the at least one co-solvent is Swiss Ordinance on Materials and Articles in Contact with Food (SR 817.023.21), Annex 10 (Edition 2.1 of Dec. 1, 2020) compliant.

In an exemplary embodiment, the at least one humectant is propylene glycol, such as USP propylene glycol. In an embodiment, the at least one humectant may by any other humectant, such as a food packaging compliant humectant. In an exemplary embodiment, the at least one humectant is Swiss Ordinance on Materials and Articles in Contact with Food (SR 817.023.21), Annex 10 (Edition 2.1 of Dec. 1, 2020) compliant.

In an exemplary embodiment, the at least one emulsifier is a phospholipid such as, but not limited to phosphatidylcholinc, phosphatidylethanolaminc, phosphatidylinositol, derivatives of lecithin and phosphatidic acid. In an exemplary embodiment, the emulsifier is a blend of phospholipids, such as Ultralec™ P available from ADM Decatur, Illinois. Other suitable emulsifiers include, but are not limited to phospholipon 90 G (American lecithin, Lipoid), phosal 50 PG (American lecithin, Lipoid), lipoid GPC (glycerophosphocholine, American lecithin, Lipoid). In an exemplary embodiment, each of the at least one emulsifier is Swiss Ordinance on Materials and Articles in Contact with Food (SR 817.023.21), Annex 10 (Edition 2.1 of Dec. 1, 2020) compliant.

In an exemplary embodiment, the at least one surfactant may act as at least one of a surface tension reducer and/or a slip additive and/or a stabilizer. In an exemplary embodiment wherein, there are four surfactants, the first surfactant may be a polyether modified polysiloxane compound, such as BYK® 345, available from BYK-Chemie GmbH of Wesel, Germany. Further in such embodiment, the second surfactant may be an ethoxylated acetylenediol based surfactant, such as Surfynol® 420, available from Evonik Industries of Essen, Germany. Still further in this embodiment, the third surfactant may be a dimethylsiloxane-ethylene oxide block copolymer, such as Gelest DBE 921, available from Gelest, Inc. of Morrisville, Pennsylvania, and the fourth surfactant may be a polyether-modified, hydroxy-functional polydimethylsiloxane, such as BYK® 3771, available from BYK-Chemie GmbH. In an alternative embodiment, the at least one surfactant may be any other dimethylsiloxane-ethylene oxide block copolymer, polyether-modified hydroxy-functional polydimethylsiloxane, dimethylsiloxane-ethylene oxide block copolymer, acetylenic diol, siloxane, modified siloxane, or any other surfactant or combination(s) thereof. In an embodiment wherein there are four surfactants, the four surfactants may comprise any one or more of BYK® 347, BYK® 348, BYK® 349, BYK® 3450, and BYK® 3754 all available from BYK-Chemie GmbH, and any one or more of Surfynol® 440, Surfynol® 465, Surfynol® 485, Surfynol® 104 PG 50, and Dynol™ 980, available from Evonik Industries and/or combination(s) thereof. In an embodiment, each of the at least one surfactant is food packaging compliant. In an exemplary embodiment, each of the at least one surfactant is Swiss Ordinance on Materials and Articles in Contact with Food (SR 817.023.21), Annex 10 (Edition 2.1 of Dec. 1, 2020) compliant.

In an exemplary embodiment, any of the constituents discussed above may be mixed into a masterbatch prior to combination with other constituents. For example, the at least one co-solvent may be mixed with the at least one surfactant into a single masterbatch: the at least one emulsifier may be mixed with the at least one colorant into a single masterbatch; or the at least one humectant may be mixed with the at least one polymer into a single masterbatch. The preceding examples are not limiting, and it is understood that two or more of the constituents may be mixed into a stable masterbatch understood by those skilled in the art.

In exemplary embodiments, the total solids loading of each of the printing compositions 1 through 8 is less than or equal to 15%, which includes pigment, polymer, and other non-liquid non-volatiles left on the substrate after drying. In alternative embodiments, the total solids loading of each of the printing compositions 1 through 8 is less than or equal to 10%, which includes pigment, polymer, and other non-liquid non-volatiles left on the substrate after drying.

The following examples further illustrate the disclosure but should not be construed as in any way limiting its scope.

Example 1. A printing composition useful in the present disclosure for ink jet application comprises the following formulation by weight:

- 30.00% by weight of a pigment dispersion (FujiFilm APD 5000 Black) (15.00% solids)
- 19.25% by weight of a polymer dispersion (NeoRez®) R-620) (36.00% solids)
- 1.39% by weight of a plasticizer (Vertellus Citroflex A-4)
- 16.50% by weight of a co-solvent (3-methoxy-3-methyl-1-butanol)
- 5.00% by weight of a humectant (Propylene Glycol)
- 0.07% by weight of a surfactant (BYK® 345)
- 1.00% by weight of a surfactant (Surfynol® 420)
- 0.25% by weight of a surfactant (Gelest DBE 921)
- 0.50% by weight of a surfactant (BYK® 3771)
- 26.04% by weight of deionized water (DI $H_2O$)

The 26.04% DI $H_2O$ is additional deionized water to the water already used for the dispersions, such as NeoRez® R-620. At 25° C., the printing composition has a viscosity of approximately 6.00 cP, a dynamic surface tension of 40.6 dynes/cm, and a pH of 7.92.

Example 2. A printing composition useful in the present disclosure for ink jet application comprises the following formulation by weight:

- 20.00% by weight of a pigment dispersion (FujiFilm APD 1000 Cyan) (15.00% solids)
- 21.16% by weight of a polymer dispersion (NeoRez®R-620) (36.00% solids)
- 1.53% by weight of a plasticizer (Vertellus Citroflex A-4)
- 16.50% by weight of a co-solvent (3-methoxy-3-methyl-1-butanol)
- 5.00% by weight of a humectant (Propylene Glycol)
- 0.07% by weight of a surfactant (BYK® 345)
- 1.00% by weight of a surfactant (Surfynol® 420)
- 0.25% by weight of a surfactant (Gelest DBE 921)
- 0.50% by weight of a surfactant (BYK® 3771)
- 33.99% by weight of deionized water (DI $H_2O$)

The 33.99% DI $H_2O$ is additional deionized water to the water already used for the dispersions, such as NeoRez® R-620. At 25° C., the printing composition has a viscosity of 5.87 cP, a dynamic surface tension of 40.5 dynes/cm, and a pH of 7.98.

Example 3. A printing composition useful in the present disclosure for ink jet application comprises the following formulation by weight:

- 30.00% by weight of a pigment dispersion (FujiFilm APD 1000 Magenta) (15.00% solids)
- 19.25% by weight of a polymer dispersion (NeoRez® R-620) (36.00% solids)
- 1.39% by weight of a plasticizer (Vertellus Citroflex A-4)
- 16.50% by weight of a co-solvent (3-methoxy-3-methyl-1-butanol)
- 5.00% by weight of a humectant (Propylene Glycol)
- 0.07% by weight of a surfactant (BYK® 345)
- 1.00% by weight of a surfactant (Surfynol® 420)
- 0.25% by weight of a surfactant (Gelest DBE 921)
- 0.50% by weight of a surfactant (BYK® 3771)
- 26.04% by weight of deionized water (DI $H_2O$)

The 26.04% DI $H_2O$ is additional deionized water to the water already used for the dispersions, such as NeoRez® R-620. At 25° C., the printing composition has a viscosity of 6.18 cP, a dynamic surface tension of 40.5 dynes/cm, and a pH of 8.12.

Example 4. A printing composition useful in the present disclosure for ink jet application comprises the following formulation by weight:

- 20.00% by weight of a pigment dispersion (FujiFilm APD 1000 Yellow) (15.00% solids)
- 22.00% by weight of a polymer dispersion (NeoRez®R-620) (36.00% solids)
- 1.58% by weight of a plasticizer (Vertellus Citroflex A-4)
- 16.50% by weight of a co-solvent (3-methoxy-3-methyl-1-butanol)
- 5.00% by weight of a humectant (Propylene Glycol)

0.07% by weight of a surfactant (BYK® 345)
1.00% by weight of a surfactant (Surfynol® 420)
0.25% by weight of a surfactant (Gelest DBE 921)
0.50% by weight of a surfactant (BYK® 3771)
33.10% by weight of deionized water (DI $H_2O$)

The 33.10% DI $H_2O$ is additional deionized water to the water already used for the dispersions, such as NeoRez® R-620. At 25° C., the printing composition has a viscosity of 6.36 cP, a dynamic surface tension of 40.6 dynes/cm, and a pH of 8.20.

Example 5. A printing composition useful in the present disclosure for ink jet application comprises the following formulation by weight:

30.00% by weight of a pigment dispersion (FujiFilm APD 1500 Black) (15.00% solids)
19.25% by weight of a polymer dispersion (NeoRez® R-620) (36.00% solids)
16.50% by weight of a co-solvent (3-methoxy-3-methyl-1-butanol)
5.00% by weight of a humectant (Propylene Glycol)
0.09% by weight of a surfactant (BYK® 3450)
0.90% by weight of a surfactant (Surfynol® 440)
28.26% by weight of deionized water (DI $H_2O$)

The 28.26% DI $H_2O$ is additional deionized water to the water already used for the dispersions, such as NeoRez® R-620. At 25° C., the printing composition has a viscosity of 5.16 cP, a dynamic surface tension of 35.0 dynes/cm, and a pH of 8.19.

Example 6. A printing composition useful in the present disclosure for ink jet application comprises the following formulation by weight:

30.00% by weight of a pigment dispersion (FujiFilm APD 1500 Black) (15.00% solids)
19.25% by weight of a polymer dispersion (NeoRez® R-620) (36.00% solids)
16.50% by weight of a co-solvent (3-methoxy-3-methyl-1-butanol)
5.00% by weight of a humectant (Propylene Glycol)
0.60% by weight of a surfactant (BYK® 3450)
0.50% by weight of a surfactant (Surfynol® 440)
0.50% by weight of a surfactant (BYK® 3754)
27.65% by weight of deionized water (DI $H_2O$)

The 27.65% DI $H_2O$ is additional deionized water to the water already used for the dispersions, such as NeoRez® R-620. At 25° C., the printing composition has a viscosity of approximately 5.11 cP, a dynamic surface tension of 31.2 dynes/cm, and a pH of 8.18.

Example 7. A printing composition useful in the present disclosure for ink jet application comprises the following formulation by weight:

16.00% by weight of a pigment dispersion (Sun D2010-W6-RD White Dispersion) (50.00% solids)
14.00% by weight of a polymer dispersion (NeoRez®) R-620) (36.00% solids)
15.00% by weight of a co-solvent (3-methoxy-3-methyl-1-butanol)
0.30% by weight of a surfactant (BYK® 345)
54.70% by weight of deionized water (DI $H_2O$)

The 54.70% DI $H_2O$ is additional deionized water to the water already used for the dispersions, such as NeoRez® R-620. At 25° C., the printing composition has a viscosity of 4.0 cP, and a pH of 8.00.

Example 8. A printing composition useful in the present disclosure for ink jet application comprises the following formulation by weight:

32.00% by weight of a polymer dispersion (NeoRez® R-620) (36.00% solids)
16.50% by weight of a co-solvent (3-methoxy-3-methyl-1-butanol)
5.00% by weight of a humectant (Propylene Glycol)
0.50% by weight of a surfactant (BYK® 345)
46.00% by weight of deionized water (DI $H_2O$)

The 46.00% DI $H_2O$ is additional deionized water to the water already used for the dispersions, such as NeoRez® R-620.

Example 9. A printing composition useful in the present disclosure for ink jet application comprises the following formulation by weight:

0.50% Sarchem CBS-X (Optical Brightener C.I. 351)
30.00% by weight of a polymer dispersion (Takelac™ WPB 341) (30.00% solids)
15.00% by weight of a co-solvent (3-methoxy-3-methyl-1-butanol)
0.25% by weight of a surfactant (BYK® 345)
1.33% by weight of a polymer modifier dispersion (20.00% Rheolate®) 125;
2.35% DMEA: 77.65% deionized water (DI $H_2O$))
52.92% by weight of deionized water (DI $H_2O$)

The 52.92% DI $H_2O$ is additional deionized water to the water already used for the dispersions, such as Takelac™ WPB 341. At 25° C., the printing composition has a viscosity of 4.52 cP, a dynamic surface tension of 29.4 dynes/cm, and a pH of 8.31.

Example 10. A printing composition useful in the present disclosure for ink jet application comprises the following formulation by weight:

16.00% by weight of a pigment dispersion (Sun D2010-W6-RD White Dispersion) (50.00% solids)
6.94% by weight of a polymer dispersion (NeoRez® R-620) (36.00% solids)
8.33% by weight of an opacifier dispersion (AQACell® HIDE 6299 na) (30.00% solids)
15.00% by weight of a co-solvent (3-methoxy-3-methyl-1-butanol)
0.30% by weight of a surfactant (BYK® 348)
53.43% by weight of deionized water (DI $H_2O$)

The 53.43% DI $H_2O$ is additional deionized water to the water already used for the dispersions, such as NeoRez® R-620. At 25° C., the printing composition has a viscosity of 4.43 cP.

Example 11. A printing composition useful in the present disclosure for ink jet application comprises the following formulation by weight:

30.00% by weight of a pigment dispersion (FujiFilm APD 5000 Black) (15.00% solids)
21.50% by weight of a polymer dispersion (Takelac™ WPB-341) (30.00% solids)
15.00% by weight of a co-solvent (3-methoxy-3-methyl-1-butanol)
0.25% by weight of a surfactant (BYK® 345)
33.25% by weight of deionized water (DI $H_2O$)

The 33.25% DI $H_2O$ is additional deionized water to the water already used for the dispersions, such as Takelac™ WPB-341. At 25° C., the printing composition has a viscosity of 4.51 cP, a dynamic surface tension of 32.6 dynes/cm, and a pH of 8.63.

Example 12. A printing composition useful in the present disclosure for ink jet application comprises the following formulation by weight:

11.20% by weight of a pigment dispersion (FujiFilm APD 1000 Cyan) (15.00% solids)
32.00% by weight of a polymer dispersion (Takelac™ WPB-341) (30.00% solids)

15.00% by weight of a co-solvent (3-methoxy-3-methyl-1-butanol)

0.25% by weight of a surfactant (BYK® 345)

41.55% by weight of deionized water (DI $H_2O$)

The 41.55% DI $H_2O$ is additional deionized water to the water already used for the dispersions, such as Takelac™ WPB-341. At 25° C., the printing composition has a viscosity of 4.48 cP, a dynamic surface tension of 31.8 dynes/cm, and a pH of 8.57.

Example 13. A printing composition useful in the present disclosure for ink jet application comprises the following formulation by weight:

30.00% by weight of a pigment dispersion (FujiFilm APD 1000 Magenta) (15.00% solids)

21.40% by weight of a polymer dispersion (Takelac™ WPB-341) (30.00% solids)

15.00% by weight of a co-solvent (3-methoxy-3-methyl-1-butanol)

0.25% by weight of a surfactant (BYK® 345)

33.35% by weight of deionized water (DI $H_2O$)

The 33.35% DI $H_2O$ is additional deionized water to the water already used for the dispersions, such as Takelac™ WPB-341. At 25° C., the printing composition has a viscosity of 4.50 cP, a dynamic surface tension of 32.7 dynes/cm, and a pH of 8.94.

Example 14. A printing composition useful in the present disclosure for ink jet application comprises the following formulation by weight:

30.00% by weight of a pigment dispersion (FujiFilm APD 1000 Yellow) (15.00% solids)

17.00% by weight of a polymer dispersion (Takelac™ WPB-341) (30.00% solids)

15.00% by weight of a co-solvent (3-methoxy-3-methyl-1-butanol)

0.25% by weight of a surfactant (BYK® 345)

37.75% by weight of deionized water (DI $H_2O$)

The 37.75% DI $H_2O$ is additional deionized water to the water already used for the dispersions, such as Takelac™ WPB-341. At 25° C., the printing composition has a viscosity of 4.53 cP, a dynamic surface tension of 32.8 dynes/cm, and a pH of 9.00.

Example 15. A printing composition useful in the present disclosure for ink jet application comprises the following formulation by weight:

30.00% by weight of a pigment dispersion (FujiFilm APD 5000 Black) (15.00% solids) 19.25% by weight of a polymer dispersion (NeoRez®) R-620) (36.00% solids) 16.50% by weight of a co-solvent (3-methoxy-3-methyl-1-butanol) 5.00% by weight of a humectant (Propylene Glycol) 1.00% by weight of a surfactant (Surfynol® 420) 28.25% by weight of deionized water (DI $H_2O$)

The 28.25% DI $H_2O$ is additional deionized water to the water already used for the dispersions, such as NeoRez® R-620.

Example 16. A printing composition useful in the present disclosure for ink jet application comprises the following formulation by weight:

20.00% by weight of a pigment dispersion (FujiFilm APD 1000 Cyan) (15.00% solids)

21.18% by weight of a polymer dispersion (NeoRez®) R-620) (36.00% solids)

16.50% by weight of a co-solvent (3-methoxy-3-methyl-1-butanol)

5.00% by weight of a humectant (Propylene Glycol)

1.00% by weight of a surfactant (Surfynol® 420)

36.32% by weight of deionized water (DI $H_2O$)

The 36.32% DI $H_2O$ is additional deionized water to the water already used for the dispersions, such as NeoRez® R-620.

Example 17. A printing composition useful in the present disclosure for ink jet application comprises the following formulation by weight:

30.00% by weight of a pigment dispersion (FujiFilm APD 1000 Magenta) (15.00% solids)

19.25% by weight of a polymer dispersion (NeoRez® R-620) (36.00% solids)

16.50% by weight of a co-solvent (3-methoxy-3-methyl-1-butanol)

5.00% by weight of a humectant (Propylene Glycol)

1.00% by weight of a surfactant (Surfynol® 420)

28.25% by weight of deionized water (DI $H_2O$)

The 28.25% DI $H_2O$ is additional deionized water to the water already used for the dispersions, such as NeoRez® R-620.

Example 18. A printing composition useful in the present disclosure for ink jet application comprises the following formulation by weight:

30.00% by weight of a pigment dispersion (FujiFilm APD 1000 Yellow) (15.00% solids)

17.25% by weight of a polymer dispersion (NeoRez®) R-620) (36.00% solids)

16.50% by weight of a co-solvent (3-methoxy-3-methyl-1-butanol)

5.00% by weight of a humectant (Propylene Glycol)

1.00% by weight of a surfactant (Surfynol® 420)

30.25% by weight of deionized water (DI $H_2O$)

The 30.25% DI $H_2O$ is additional deionized water to the water already used for the dispersions, such as NeoRez® R-620.

Example 19. A printing composition useful in the present disclosure for ink jet application comprises the following formulation by weight:

30.00% by weight of a pigment dispersion (FujiFilm APD 5000 Black) (15.00% solids)

19.25% by weight of a polymer dispersion (NeoRez®) R-620) (36.00% solids)

16.50% by weight of a co-solvent (3-methoxy-3-methyl-1-butanol)

5.00% by weight of a humectant (Propylene Glycol)

0.90% by weight of a surfactant (Surfynol® 440)

0.09% by weight of a surfactant (BYK® 3450)

28.26% by weight of deionized water (DI $H_2O$)

The 28.26% DI $H_2O$ is additional deionized water to the water already used for the dispersions, such as NeoRez® R-620.

Example 20. A printing composition useful in the present disclosure for ink jet application comprises the following formulation by weight:

30.00% by weight of a pigment dispersion (FujiFilm APD 1500 Black) (15.00% solids)

19.25% by weight of a polymer dispersion (NeoRez® R-620) (36.00% solids)

1.39% by weight of a plasticizer (Vertellus Citroflex A-4)

16.50% by weight of a co-solvent (3-methoxy-3-methyl-1-butanol)

5.00% by weight of a humectant (Propylene Glycol)

0.07% by weight of a surfactant (BYK® 345)

1.00% by weight of a surfactant (Surfynol® 420)

0.25% by weight of a surfactant (Gelest DBE 921)

0.50% by weight of a surfactant (BYK® 3771)

26.04% by weight of deionized water (DI $H_2O$)

The 26.04% DI $H_2O$ is additional deionized water to the water already used for the dispersions, such as NeoRez® R-620.

Example 21. A printing composition useful in the present disclosure for ink jet application comprises the following formulation by weight:

30.00% by weight of a pigment dispersion (FujiFilm APD 1500 Black) (15.00% solids)
19.25% by weight of a polymer dispersion (NeoRez®) R-620) (36.00% solids)
16.50% by weight of a co-solvent (3-methoxy-3-methyl-1-butanol)
0.25% by weight of an emulsifier (ADM Ultralec™ P)
5.00% by weight of a humectant (Propylene Glycol)
0.60% by weight of a surfactant (BYK® 3450)
0.70% by weight of a surfactant (Surfynol® 465)
27.70% by weight of deionized water (DI $H_2O$)

The 27.70% DI $H_2O$ is additional deionized water to the water already used for the dispersions, such as NeoRez® R-620.

Example 22. A printing composition useful in the present disclosure for ink jet application comprises the following formulation by weight:

20.00% by weight of a pigment dispersion (FujiFilm APD 1000 Cyan) (15.00% solids)
23.50% by weight of a polymer dispersion (NeoRez® R-620) (36.00% solids)
16.50% by weight of a co-solvent (3-methoxy-3-methyl-1-butanol)
0.25% by weight of an emulsifier (ADM Ultralec™ P)
5.00% by weight of a humectant (Propylene Glycol)
0.60% by weight of a surfactant (BYK® 3450)
0.70% by weight of a surfactant (Surfynol® 465)
33.45% by weight of deionized water (DI $H_2O$)

The 33.45% DI $H_2O$ is additional deionized water to the water already used for the dispersions, such as NeoRez® R-620.

Example 23. A printing composition useful in the present disclosure for ink jet application comprises the following formulation by weight:

18.33% by weight of a pigment dispersion (FujiFilm APD 1000 Magenta) (15.00% solids)
17.48% by weight of a pigment dispersion (FujiFilm APD 1000 Red) (15.00% solids)
19.25% by weight of a polymer dispersion (NeoRez®) R-620) (36.00% solids)
16.50% by weight of a co-solvent (3-methoxy-3-methyl-1-butanol)
0.30% by weight of an emulsifier (ADM Ultralec™ P)
5.00% by weight of a humectant (Propylene Glycol)
0.60% by weight of a surfactant (BYK® 3450)
0.70% by weight of a surfactant (Surfynol® 465)
21.84% by weight of deionized water (DI $H_2O$)

The 21.84% DI $H_2O$ is additional deionized water to the water already used for the dispersions, such as NeoRez® R-620.

Example 24. A printing composition useful in the present disclosure for ink jet application comprises the following formulation by weight:

20.00% by weight of a pigment dispersion (FujiFilm APD 1000 Yellow) (15.00% solids)
23.50% by weight of a polymer dispersion (NeoRez®) R-620) (36.00% solids)
16.50% by weight of a co-solvent (3-methoxy-3-methyl-1-butanol)
0.25% by weight of an emulsifier (ADM Ultralec™ P)
5.00% by weight of a humectant (Propylene Glycol)
0.60% by weight of a surfactant (BYK® 3450)
0.70% by weight of a surfactant (Surfynol® 465)
33.45% by weight of deionized water (DI $H_2O$)

The 33.45% DI $H_2O$ is additional deionized water to the water already used for the dispersions, such as NeoRez® R-620.

Example 25. A printing composition useful in the present disclosure for ink jet application comprises the following formulation by weight:

30.00% by weight of a pigment dispersion (FujiFilm APD 1500 Black) (15.00% solids)
19.25% by weight of a polymer dispersion (NeoRez® R-620) (36.00% solids)
16.50% by weight of a co-solvent (3-methoxy-3-methyl-1-butanol)
0.25% by weight of an emulsifier (ADM Ultralec™ P)
5.00% by weight of a humectant (Propylene Glycol)
1.00% by weight of a surfactant (BYK® 3450)
0.70% by weight of a surfactant (Surfynol® 465)
27.30% by weight of deionized water (DI $H_2O$)

The 27.30% DI $H_2O$ is additional deionized water to the water already used for the dispersions, such as NeoRez® R-620.

Example 26. A printing composition useful in the present disclosure for ink jet application comprises the following formulation by weight:

30.00% by weight of a pigment dispersion (FujiFilm APD 1500 Black) (15.00% solids)
19.25% by weight of a polymer dispersion (NeoRez® R-620) (36.00% solids)
16.50% by weight of a co-solvent (3-methoxy-3-methyl-1-butanol)
0.05% by weight of an emulsifier (Phospholipon 90 G)
5.00% by weight of a humectant (Propylene Glycol)
1.00% by weight of a surfactant (BYK® 3450)
0.70% by weight of a surfactant (Surfynol® 465)
27.50% by weight of deionized water (DI $H_2O$)

The 27.50% DI $H_2O$ is additional deionized water to the water already used for the dispersions, such as NeoRez® R-620.

Example 27. A printing composition useful in the present disclosure for ink jet application comprises the following formulation by weight:

16.00% by weight of a pigment dispersion (Sun D2010-W6-RD White Dispersion) (50.00% solids)
14.00% by weight of a polymer dispersion (NeoRez®) R-620) (36.00% solids)
15.00% by weight of a co-solvent (3-methoxy-3-methyl-1-butanol)
0.30% by weight of a surfactant (BYK® 3450)
0.15% by weight of a surfactant (Surfynol 465)
1.00% by weight of a printing aid (Anderson Advance Ingredients Tap'PD Tapioca Polydextrose Powder)
1.00% by weight of a printing aid (Liquilube 405)
55.55% by weight of deionized water (DI $H_2O$)

The 55.55% DI $H_2O$ is additional deionized water to the water already used for the dispersions, such as NeoRez® R-620.

Example 28. A printing composition useful in the present disclosure for ink jet application comprises the following formulation by weight:

32.00% by weight of a polymer dispersion (NeoRez® R-620) (36.00% solids)
16.50% by weight of a co-solvent (3-methoxy-3-methyl-1-butanol)
5.00% by weight of a humectant (Propylene Glycol)

0.10% by weight of a UV blue water soluble dye (D282-Dayglo)

1.00% by weight of a surfactant (BYK® 345)

0.125% by weight of an emulsifier (ADM Ultralec™ P)

45.275% by weight of deionized water (DI $H_2O$)

The 46.00% DI $H_2O$ is additional deionized water to the water already used for the dispersions, such as NeoRez® R-620.

Example 29. A printing composition useful in the present disclosure for ink jet application comprises the following formulation by weight:

0.25% Sarchem CBS-X (Optical Brightener C.I. 351)

30.00% by weight of a polymer dispersion (Takelac™ WPB 341) (30.00% solids)

15.00% by weight of a co-solvent (3-methoxy-3-methyl-1-butanol)

0.25% by weight of a surfactant (BYK® 345)

1.33% by weight of a polymer modifier dispersion (20.00% Rheolate® 125;

2.35% DMEA: 77.65% deionized water (DI $H_2O$))

53.17% by weight of deionized water (DI $H_2O$)

The 53.17% DI $H_2O$ is additional deionized water to the water already used for the dispersions, such as Takelac™ WPB 341.

The overall viscosity of the printing compositions 1 through 7 disclosed above that may be deposited via ink jet printing technologies will vary depending upon print head(s) that is (are) used. In an exemplary embodiment the printing composition viscosity is from 2 cP to 10 cP. In one embodiment, the printing composition viscosity is from 3 cP to 10 cP. In one embodiment, the printing composition viscosity is from 4 cP to 7 cP. Viscosity measurements were measured at 25° C., 100 rpm using a Brookfield viscometer using ultra-low viscosity setup, as measured by ASTM D7867-13 (2020), which is hereby incorporated in its entirety by reference herein. Dynamic surface tension measurements were measured using the standard test method for dynamic surface tension using the fast bubble technique, as measured by ASTM D3825-90, which the current version as of the filing date of this application is hereby incorporated in its entirety by reference herein. The pH measurements were measured using the standard test methods for pH of water, as measured by ASTM D1293-18, which the current version as of the filing date of this application is hereby incorporated in its entirety by reference herein.

Furthermore, the pH of the printing compositions disclosed above that may be deposited via ink jet printing technologies vary depending upon print head(s) that are used but are not less than 7.

Furthermore, the printing compositions disclosed above are suitable for use on a web subject to dimensional modification, such as heat-shrinkable film, due to the exemplary ability to dry and/or cure at low drying temperatures up to the threshold for dimensional integrity of the web, which may be for example 85° C. (185° F.). The at least one co-solvent in the above printing compositions is believed to have an evaporation profile within the threshold for dimensional integrity of the web that in combination with the other printing components allows for efficient drying and adherence of the printing components to the web. Additionally, within the threshold for dimensional integrity of the web, the amount of polymer, polymer dispersion, and/or polymer emulsion and/or at least one polymer solution in the above printing compositions is believed to be stable in a larger amount when added with the at least one co-solvent and other components in the printing compositions. The high loading of the polymer, polymer solution, or polymer dispersion in the above printing compositions is believed to allow greater adherence of the printing composition to the web or coated surface without diluting or decreasing the viscosity outside the viscosity range of the print head(s). Additionally, the optimal drying and/or curing at such low drying temperatures allow the printing compositions to be used for variable ink jet printing with a high throughput. The ability to use such printing compositions at varying throughput and varying temperature makes short-run printing operation and market-segment targeting more economically feasible.

Several examples described above were tested for adhesion durability according to the durability test methods outlined below.

Durability Test Methods

Slow Tape Test

A smooth piece of ¾ inch 3M™ #600 clear pressure sensitive tape was applied across the entirety of a printed surface having been printed with a printing composition. Any air bubbles or wrinkles in the tape were removed. The tape was pulled with a steady, slow, smooth motion at a 45-degree angle from the printed surface. The printed surface was examined for ink pickoff. While ideal samples have 100% adhesion (i.e., 0% pickoff), the adhesion of the printing composition was rated on a scale of 1 to 5.

5=0% ink loss

4=1% to 25% ink loss

3=25% to 50% ink loss

2=50% to 75% ink loss

1=75% to 100% ink loss

Fast Tape Test

A smooth piece of ¾ inch 3M™ #600 clear pressure sensitive tape was applied across the entirety of a printed surface having been printed with a printing composition. Any air bubbles or wrinkles in the tape were removed. The tape was pulled with a steady, fast, smooth motion at a 45-degree angle from the printed surface. The printed surface was examined for ink pickoff. While ideal samples have 100% adhesion (i.e., 0% pickoff), the adhesion of the printing composition was rated on a scale of 1 to 5.

5=0% ink loss

4=1% to 25% ink loss

3=25% to 50% ink loss

2=50% to 75% ink loss

1=75% to 100% ink loss

Shrink Test

A 2 inch by 5 inch sample of a printed surface having been printed with a printing composition was submerged in 85.55° C. (186° F.) for 20 seconds. The sample was allowed to cool. Adhesion of the ink was tested by checking for ink pickoff and gently rubbing the printed surface. While ideal samples have 100% adhesion (i.e., 0% pickoff), the adhesion of the printing composition was rated on a scale of 1 to 5.

5=0% ink loss

4=1% to 25% ink loss

3=25% to 50% ink loss

2=50% to 75% ink loss

1=75% to 100% ink loss

Paper Clip Test

A 2 inch by 5 inch sample of a printed surface having been printed with a printing composition was fan folded multiple times and secured with a paper clip. The sample was submerged in 85.55° C. (186° F.) for 20 seconds. The sample was allowed to cool. The paperclip was removed, and adhesion of the ink was tested by checking for ink pickoff.

While ideal samples have 100% adhesion (i.e., 0% pickoff), the adhesion of the printing composition was rated on a scale of 1 to 5.

5=0% ink loss
4=1% to 25% ink loss
3=25% to 50% ink loss
2=50% to 75% ink loss
1=75% to 100% ink loss Rub Test A corrugated cardboard was taped to the pad on the TMI™ or similar rub tester. A 2 inch by 5 inch sample of a printed surface having been printed with a printing composition was attached to a 5 pound weight, and rubbed against the cardboard (200 strokes at 42 strokes/min). Adhesion of the ink was tested by checking for ink pickoff. While ideal samples have 100% adhesion (i.e., 0% pickoff), the adhesion of the printing composition was rated on a scale of 1 to 5.

5=0% ink loss
4=1% to 25% ink loss
3=25% to 50% ink loss
2=50% to 75% ink loss
1=75% to 100% ink loss Durability Score The durability score is the sum of all five durability tests (Slow Tape Test, Fast Tape Test, Shrink Test, Paper Clip Test, and Rub Test). A score of 25 is 100% durable.

TABLE 1

Durability evaluation for printing compositions at 70 fpm

| Composition | Slow Tape Test | Fast Tape Test | Shrink Test | Paper Clip Test | Rub Test | Durability Score |
|---|---|---|---|---|---|---|
| Example 1 | 5.0 | 4.9 | 5.0 | 3.0 | 2.0 | 19.9 |
| Example 5 | 4.0 | 4.0 | 5.0 | 5.0 | 4.0 | 22.0 |
| Example 7 | 4.0 | 2.0 | 5.0 | 5.0 | 4.0 | 20.0 |
| Example 10 | 1.0 | 1.0 | 4.5 | 4.5 | 3.5 | 14.5 |
| Example 11 | 4.0 | 3.0 | 5.0 | 4.7 | 4.7 | 21.4 |
| Example 15 | 3.0 | 2.0 | 5.0 | 4.7 | 3.7 | 18.4 |
| Example 19 | 4.0 | 4.5 | 5.0 | 4.2 | 4.6 | 22.3 |

The examples of Table 1 were either black or white ink compositions printed directly onto a substrate.

TABLE 2

Durability evaluation for printing composition at 230 fpm

| Composition | Slow Tape Test | Fast Tape Test | Shrink Test | Paper Clip Test | Rub Test | Durability Score |
|---|---|---|---|---|---|---|
| Example 6 | 5.0 | 4.9 | 5.0 | 4.9 | 3.0 | 22.8 |

The example of Table 2 was of a black ink printed directly onto a white ink, wherein the white ink was printed directly onto a substrate.

INDUSTRIAL APPLICABILITY

In summary, printing compositions described above improve upon the ability to print an ink jet image on a polymeric flexible and/or shrinkable substrate, such as a polyolefin substrate, with ink(s) that are water-based and comprise food law compliant component(s) for food packaging, such as substance(s) listed in annex(es) of Swiss Ordinance on Materials and Articles in Contact with Food (SR 817.023.21). The ink jet compositions allow for ease in jetting and/or applying the ink jet compositions directly to a polymeric flexible and/or shrinkable substrate or directly onto another ink for formation of proper drop size on the substrate, and proper durability characteristics without requiring a primer and/or overprint varnish.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the embodiments (especially in the context of the following claims) are to be construed to cover both the singular and the plural, unless otherwise indicated herein or clearly contradicted by context. Recitation of ranges of values (i.e. amounts) herein are merely intended to serve as a shorthand method of referring individually to each separate value falling within the range, unless otherwise indicated herein, and each separate value is incorporated into the specification as if it were individually recited herein. In a case in which a constituent comprises multiple components, selection of one or more amount(s) of one or more components of the constituent may result in the necessity/desirability to limit the amount(s) of one or more remaining component(s) of the constituent while keeping each such remaining component amount within a portion of its specified component range so that the percentage by weight of the constituent in the overall printing composition falls within the specified constituent range. Similarly, selection of one or more amounts of one or more constituents may result in the necessity/desirability to limit the amount(s) of one or more other constituent(s) each to a value within a portion of its associated specified range. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure. Unless otherwise noted, all recitations of weight percentages are with reference to a unit weight of the printing composition as a whole.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An ink jet printing composition, comprising:

from 1.00% to 6.00% by weight of at least one pigment;

from 5.00% to 11.00% by weight of at least one polymer;

from 14.50% to 17.50% by weight of at least one co-solvent, the co-solvent being 3-methoxy-3-methyl-1-butanol;

from 4.50% to 5.50% by weight of at least one humectant, the humectant being propylene glycol;

from 1.00% to 2.75% by weight of at least one surfactant; and water.

2. The printing composition of claim 1, wherein the printing composition has a viscosity from 2 cP to 10 cP as measured by ASTM D7867-13 (2020).

3. The printing composition of claim 1, wherein the at least one polymer is at least one polymer dispersion, at least one polymer emulsion, or at least one polymer solution that is anionic.

4. The printing composition of claim 1, wherein the at least one polymer comprises a low-molecular weight polymer.

5. The printing composition of claim 4, wherein the low-molecular weight polymer is a plasticizer that is used for increased flexibility and plasticity.

6. The printing composition of claim 1 further comprising 0.10% to 0.50% by weight of at least one emulsifier.

7. The printing composition of claim 6, wherein the at least one emulsifier is a phospholipid.

8. The printing composition of claim 1, wherein at least one of the at least one pigment, the at least one polymer, the at least one co-solvent, the at least one humectant, and the at least one surfactant are Swiss Ordinance on Materials and Articles in Contact with Food (SR 817.023.21), Annex 10 (Edition 2.1 of Dec. 1, 2020) compliant.

9. A method of printing, comprising:

providing a substrate;

applying an ink jet printing composition to a surface of the substrate, the ink jet printing composition comprising from 1.00% to 6.00% by weight of at least one pigment, from 5.00% to 11.00% by weight of at least one polymer, from 14.50% to 17.50% by weight of at least one co-solvent, the co-solvent being 3-methoxy-3-methyl-1-butanol, from 4.50% to 5.50% by weight of at least one humectant, the humectant being propylene glycol, from 1.00% to 2.75% by weight of at least one surfactant, and water; and drying the substrate.

10. The method of claim 9, wherein the substrate is a flexible substrate.

11. The method of claim 10, wherein the substrate is a heat-shrinkable substrate and wherein the co-solvent has an evaporation profile that allows drying and adherence of the printing composition applied to the heat-shrinkable substrate at temperatures up to the threshold for dimensional integrity of the heat-shrinkable substrate.

12. The method of claim 9, wherein the substrate is processed by a surface energy modification system.

13. The method of claim 12, wherein the surface energy modification system is corona treatment.

14. The method of claim 9, wherein the printing composition has a viscosity from 2 cP to 10 cP as measured by ASTM D7867-13 (2020).

15. The method of claim 9, wherein the at least one polymer is at least one polymer dispersion, at least one polymer emulsion or at least one polymer solution that is anionic.

16. The method of claim 9, wherein the at least one polymer comprises a low-molecular weight polymer.

17. The method of claim 16, wherein the low-molecular weight polymer is a plasticizer that is used for increased flexibility and plasticity.

18. The method of claim 9, wherein at least one of the at least one pigment, the at least one polymer, the at least one co-solvent, the at least one humectant, and the at least one surfactant are Swiss Ordinance on Materials and Articles in Contact with Food (SR 817.023.21), Annex 10 (Edition 2.1 of Dec. 1, 2020) compliant.

19. The method of claim 9 wherein the ink jet printing composition further comprising 0.10% to 0.50% by weight of at least one emulsifier.

20. The method of claim 19, wherein the at least one emulsifier is a phospholipid.

* * * * *